United States Patent
Liu et al.

(10) Patent No.: US 10,476,397 B2
(45) Date of Patent: *Nov. 12, 2019

(54) INTERLEAVED RESONANT CONVERTER

(71) Applicant: GANPOWER INTERNATIONAL INC, Vancouver, BC (CA)

(72) Inventors: Yan-Fei Liu, Kingston (CA); Zhiyuan Hu, Plano, TX (US)

(73) Assignee: Ganpower International Inc., Vancouver, B.C. (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/670,119

(22) Filed: Aug. 7, 2017

(65) Prior Publication Data

US 2018/0062528 A1 Mar. 1, 2018

Related U.S. Application Data

(63) Continuation of application No. 14/428,177, filed as application No. PCT/CA2013/000773 on Sep. 13, 2013, now Pat. No. 9,729,070.

(Continued)

(51) Int. Cl.
*H02M 3/335* (2006.01)
*H02M 3/28* (2006.01)
(Continued)

(52) U.S. Cl.
CPC ....... *H02M 3/33546* (2013.01); *H02M 3/285* (2013.01); *H02M 3/3376* (2013.01);
(Continued)

(58) Field of Classification Search
CPC . H02M 2007/4815; H02M 2007/4818; H02M 1/083; H02M 3/33507; H02M 3/33546
See application file for complete search history.

(56) References Cited

U.S. PATENT DOCUMENTS 6,567,285 B2 * 5/2003 Cho ................. H02M 3/3376
363/132
9,729,070 B2 * 8/2017 Liu ................... H02M 3/285
(Continued)

FOREIGN PATENT DOCUMENTS

EP 2299580 7/2011

OTHER PUBLICATIONS

Kim, Bong-Chul et al., "Load Sharing Characteristic of Two-Phase Interleaved LLC Resonant Converter with Parallel and Series Input Structure." Energy Conversion Congress and Exposition, 2009. ECCE 2009, IEEE, pp. 750-753. DOI: 10.1109/ECCE.2009.5316053.

(Continued)

*Primary Examiner* — Adolf D Berhane
*Assistant Examiner* — Afework S Demisse
(74) *Attorney, Agent, or Firm* — Stephen J. Scribner

(57) ABSTRACT

Provided are methods and circuits for a resonant converter comprising at least one switch-controlled capacitor, wherein the at least one switch-controlled capacitor controls a resonant frequency of the resonant tank circuit. Provided are constant and variable switching frequency embodiments, and fill-wave and half-wave switch-controlled capacitor embodiments. Also provided are interleaved resonant converters based on constant and variable switching frequency, and full-wave and half-wave switch-controlled capacitor resonant converter embodiments. Interleaved embodiments overcome load sharing problems associated with prior interleaved resonant converters and enable phase shedding to improve light load efficiency.

17 Claims, 13 Drawing Sheets

Related U.S. Application Data

(60) Provisional application No. 61/701,161, filed on Sep. 14, 2012.

(51) Int. Cl.
*H02M 3/337* (2006.01)
*H02M 1/00* (2006.01)
*H02M 7/48* (2007.01)

(52) U.S. Cl.
CPC ............... *H02M 2001/0058* (2013.01); *H02M 2007/4818* (2013.01); *Y02B 70/1433* (2013.01); *Y02B 70/1441* (2013.01); *Y02B 70/1491* (2013.01); *Y02P 80/112* (2015.11)

(56) References Cited

U.S. PATENT DOCUMENTS

| | | | | |
|---|---|---|---|---|
| 2007/0086224 | A1* | 4/2007 | Phadke | H02M 3/285 363/65 |
| 2007/0159862 | A1 | 7/2007 | Vinciarelli | |
| 2008/0298093 | A1 | 12/2008 | Jin et al. | |
| 2012/0044722 | A1* | 2/2012 | Cuk | H02M 3/335 363/21.03 |

OTHER PUBLICATIONS

Figge, H. et al., "Paralleling of LLC resonant converters using frequency controlled current balancing." Power Electronics Specialists Conference, 2008. PESC 2008. IEEE, pp. 1080-1085. DOI: 10.1109/PESC.2008.4592073.

Orietti, E. et al., "Analysis of multi-phase LLC resonant converters" Power Electronics Conference, 2009. COBEP 09. Brazilian, pp. 464-461. DOI: 10.1109/COBEP.2009.5347673.

Chen, Y-T. et al., "Analysis and design of a dimmable electronic ballast controlled by a switch-controlled capacitor." IEEE Transactions on Industrial Electronics ( vol. 52, Issue: 6, Dec. 2005 ), pp. 1564-1572, DOI: 10.1109/TIE.2005.858727.

Gu W-J. et al., "A new method to regulate resonant converters." IEEE Transactions on Power Electronics ( vol. 3, Issue: 4, Oct. 1988), pp. 430-439, DOI: 10.1109/63.17964.

Orietti, E., et al., "Current sharing in three-phase LLC interleaved resonant converter." Energy Conversion Congress and Exposition, 2009. ECCE 2009. IEEE, pp. 1145-1152. DOI: 10.1109/ECCE.2009.5316510.

Cheng J-h. et al., "Dynamic analysis of the Class-D converter at fixed frequency using amplitude and phase modulation." Power Electronics Specialists Conference, 1998. PESC 98 Record. 29th Annual IEEE, pp. 387-393. DOI: 10.1109/PESC.1998.701928.

Gu, W-J. et al., "A circuit model for the class E resonant DC-DC converter regulated at a fixed switching frequency." IEEE Transactions on Power Electronics ( vol. 7, Issue: 1, Jan. 1992 ) pp. 99-110. DOI: 10.1109/63.124582.

International Search Report—Written Opinion PCT/CA2013/000773 dated Dec. 23, 2013.

Cheng J-H. et al., "A generalized DC model and low-frequency dynamic analysis for the Class-D converter at fixed frequency." Power Electronics Specialists Conference, 1997. PESC '97 Record., 28th Annual IEEE, pp. 1212-1220. DOI: 10.1109/PESC.1997.616729.

Hu, Z. et al., "An Interleaved LLC Resonant Converter Operating at Constant Switching Frequency." IEEE Transactions on Power Electronics ( vol. 29, Issue: 6, Jun. 2014 ), pp. 3541-3548. DOI: 10.1109/TPEL.2013.2273939.

Yi, K-H. et al., "A simple and novel two phase interleaved LLC series resonant converter employing a phase of the resonant capacitor." Energy Conversion Congress and Exposition, 2009. ECCE 2009. IEEE, pp. 754-757. DOI: 10.1109/ECCE.2009.5316482.

Cheng, J-H. et al., "A small-signal model utilizing amplitude modulation for the Class-D converter at fixed frequency." Power Electronics Specialists Conference, 1998. PESC 98 Record. 29th Annual IEEE, pp. 1212-1220. DOI: 10.1109/PESC.1998.701927.

Huber, L. et al., "Evaluation of AC VRM topologies for high-frequency power distribution systems." Applied Power Electronics Conference and Exposition, 2001. APEC 2001. Sixteenth Annual IEEE, pp. 160-166. DOI: 10.1109/APEC.2001.911642.

Chiu H-J. et al., "Single-Stage Voltage Source Charge-Pump Electronic Ballast With Switched-Capacitor Dimmer for Multiple Fluorescent Lamps." IEEE Transactions on Industrial Electronics ( vol. 54, Issue: 5, Oct. 2007 ), pp. 2915-2918, DOI: 10.1109/TIE.2007.896031.

International Search Report PCT/CA2013/000773 dated Dec. 23, 2013.

KiM B-C. et al., "Load sharing characteristic of two-phase interleaved LLC resonant converter with parallel and series input structure." Energy Conversion Congress and Exposition, 2009. ECCE 2009. IEEE, 750-753. DOI: 10.1109/ECCE.2009.5316053.

* cited by examiner

INTERLEAVED RESONANT CONVERTER

RELATED APPLICATIONS

This application is a continuation of application Ser. No. 14/428,177, now U.S. Pat. No. 9,729,070, which is a 371 of International Application No. PCT/CA2013/000773, filed on Sep. 3, 2013, and claims the benefit of the filing date of Application No. 61/701,161, filed on Sep. 14, 2012, the contents of which are incorporated herein by reference in their entirety.

FIELD

This invention relates to the field of power converters. More particularly, this invention relates to resonant power converters and interleaved resonant power converters, and methods and circuits for their control.

BACKGROUND

With increasing power consumption of electronic devices there is a requirement for greater efficiency over the entire load range of power converters. While higher capacity power converters are desired, improving the light load efficiency is important because the light-load condition may constitute a substantial portion of the of the total converter usage time. However, the pursuit of higher power capacity is usually the priority in power supply design and consequently light load efficiency is sacrificed for higher power performance.

The LLC resonant converter provides the highest efficiency for front-end DC/DC conversion, and it is becoming the predominant topology in many applications. To increase the power capacity of an LLC resonant converter, or to mitigate the current stress of the output capacitor, interleaving is used to parallel two or more LLC power stages [1-5]. It is expected that each LLC power stage is optimized for lower power, and a high overall output power is achieved by the total output of several LLC power stages.

Load sharing is the key problem for interleaved LLC topologies. This is because the LLC converter is frequency-controlled, and when interleaved, all the LLC stages must operate at the same switching frequency for current ripple cancellation. However, at the same switching frequency, individual LLC stages may have different output powers due to component tolerances of the resonant tank circuits of each stage. This results in current imbalance between stages, such that the interleaved LLC converter does not operate properly.

Previous work on multiphase LLCs provided several load-sharing solutions but all have limitations. For example, the load sharing method in [1] solves the load sharing problem by tracking the switching frequency point at which current balance is achieved between the two non-identical LLC stages. However, since the switching frequency becomes the control variable of the load sharing loop, the freedom for voltage regulation is lost. Therefore, an additional Buck stage is needed to control the output voltage, which degrades the efficiency. Also, this method is unsuitable for more than two paralleled LLC stages, because three or more non-identical LLC stages are unlikely to reach the same output gain at the same switching frequency.

The series-input structure in [2] automatically achieves load sharing because the phase with higher output current causes the input voltage to drop, and in turn reduces the output current to the balanced point. However in this structure, the input voltage is divided by the two phases, so for half the input voltage, the primary current will double, split by two phases; and in each phase, the primary current remains approximately the same as the single-phase LLC. Therefore, the load capacity is still limited by the resonant tank design trade-offs. Further, phase shedding in this configuration is difficult because when one phase shuts down, the input voltage of the other phase will double, exceeding the design limit.

The topology in [3] automatically achieves load sharing because the resonant tanks of all phases are tied together, and the current circulates among all the phases. However, phase shedding is difficult because if any phase is shut down, it is still connected in the network, obstructing the operation of other phases.

SUMMARY

Provided herein are full-wave and half-wave switch-controlled capacitor resonant converters. As described herein, one or more than one switch-controlled capacitor (SCC) is used to control the resonant frequency of the converter, as an alternative or a supplement to the switching frequency modulation method.

Also provided herein are interleaved resonant converters, having two or more converter phases, wherein the resonant converter phases include full-wave or half-wave switch-controlled capacitors. In embodiments described herein, switch-controlled capacitors are used to overcome load sharing problems associated with prior interleaved resonant converters. The methods and circuits provided herein enable interleaving of any number of resonant converter phases to expand power capacity of the power converter, and enable phase shedding to improve light load efficiency of the power converter.

Provided herein are constant switching frequency embodiments with full-wave SCC control (fSCC), which may be favourable in applications such as high-level system integration. Also provided are synchronized variable switching frequency embodiments with half-wave SCC control (hSCC). Such embodiments reduce the component count and simplify the driving circuit, relative to embodiments with full-wave SCC control.

Synchronized variable switching frequency fSCC and hSCC interleaved embodiments with a simplified master phase further reduce the component count. For example, in some embodiments, the switch-controlled capacitor may be omitted in a simplified master resonant converter phase.

Provided herein is a resonant converter, comprising: an input for receiving an input DC voltage; at least one switch-controlled capacitor; a resonant tank circuit including at least one inductor and at least one capacitor; and an output for outputting an output DC voltage; wherein the at least one switch-controlled capacitor controls a resonant frequency of the resonant tank circuit.

In one embodiment, the resonant converter is a LLC resonant converter. In another embodiment, the switching frequency is constant. In another embodiment, the at least one switch-controlled capacitor is controlled by a feedback loop of a controller of the resonant converter.

In another embodiment, the switching frequency is variable. In another embodiment, the switching frequency is controlled by a feedback loop of a controller of the resonant converter; and the at least one switch-controlled capacitor is controlled by a controller of the resonant converter.

In embodiments provided herein, the at least one switch-controlled capacitor may be a full-wave switch-controlled capacitor or a half-wave switch-controlled capacitor.

Also provided herein is an interleaved resonant converter, comprising: two or more resonant converter phases, wherein each phase comprises: an input for receiving an input DC voltage; at least one switch-controlled capacitor; a resonant tank circuit including at least one inductor and at least one capacitor; and an output for outputting an output DC voltage; wherein the at least one switch-controlled capacitor controls a resonant frequency of the tank circuit; wherein the two or more phases are connected together such that inputs of the resonant converters are connected in parallel and outputs of the resonant converters are connected in parallel.

In one embodiment, the two or more resonant converter phases are LLC resonant converters. In another embodiment, the two or more resonant converter phases operate at substantially identical and substantially constant switching frequency; and resonant frequencies of the two or more resonant converter phases are controlled by switch-controlled capacitors.

In another embodiment, switching frequencies of the two or more resonant converter phases are substantially the same; wherein the switching frequencies are controlled; and resonant frequencies of the two or more resonant converter phases are controlled by switch-controlled capacitors. In one embodiment, the switching frequencies are controlled by a voltage feedback loop of a controller of the interleaved resonant converter. In another embodiment, the switch-controlled capacitors are controlled by a load-sharing feedback loop of a controller of the interleaved resonant converter.

In another embodiment, an interleaved resonant converter includes a master resonant converter phase, wherein the master resonant converter phase lacks a switch-controlled capacitor.

Also provided herein is a method of operating a resonant converter, comprising: controlling a resonant frequency of a resonant tank circuit of the resonant converter using at least one switch-controlled capacitor; and controlling a switching frequency of the resonant converter.

In one embodiment, the method comprises operating a LLC resonant converter.

In another embodiment, the method comprises operating the resonant converter at a substantially constant switching frequency. The method may comprise controlling the switch-controlled capacitor using a feedback loop of a controller of the resonant converter.

In another embodiment, the method comprises operating the resonant converter at a variable switching frequency. The method may comprise controlling the switching frequency using a feedback loop of a controller of the resonant converter. The method may comprise controlling the switch-controlled capacitor using a controller of the resonant converter.

In various embodiments, the method comprises using a full-wave switch-controlled capacitor or a half-wave switch-controlled capacitor.

Also provided is a method of operating an interleaved resonant converter including two or more resonant converter phases, wherein the two or more phases are connected together such that inputs of the resonant converters are connected in parallel and outputs of the resonant converters are connected in parallel, comprising: controlling each resonant converter phase according to a method as described herein.

In another embodiment the method comprises operating the two or more resonant converter phases at a substantially identical and substantially constant switching frequency; and controlling resonant frequencies of the two or more resonant converter phases using switch-controlled capacitors. In one embodiment, controlling resonant frequencies of the two or more resonant converter phases provides output voltage regulation. In another embodiment, controlling resonant frequencies of the two or more resonant converter phases provides load sharing.

In another embodiment the method comprises controlling switching frequencies of the two or more resonant converter phases to be substantially the same; and controlling resonant frequencies of the two or more resonant converter phases using switch-controlled capacitors. The method may include controlling switching frequencies using a voltage feedback loop of a controller of the interleaved resonant converter. The method may include controlling switch-controlled capacitors using a load-sharing feedback loop of a controller of the interleaved resonant converter.

In various embodiments the method includes operating a master resonant converter phase without a switch-controlled capacitor.

In another embodiment the method includes using switch-controlled capacitors of the resonant converter phases to control the resonant frequencies according to the current of the master resonant converter phase.

BRIEF DESCRIPTION OF THE DRAWINGS

Embodiments of the invention are described below, by way of example, with reference to the accompanying drawings, wherein.

DETAILED DESCRIPTION OF EMBODIMENTS

Figure 1A:
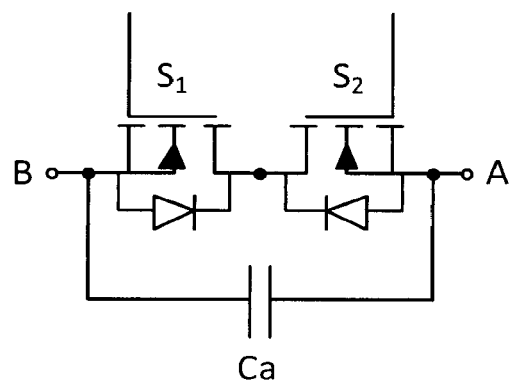
FIG. 1(a) is a schematic diagram of a full-wave switch-controlled capacitor (fSCC) according to one embodiment.

Provided herein are full-wave and half-wave switch-controlled capacitor (SCC) resonant converters. In embodiments described herein, one or more full-wave or half-wave switch-controlled capacitor is used to control the resonant frequency of the converter, as an alternative or a supplement to the switching frequency modulation method.

Also provided herein are interleaved SCC resonant converters having two or more resonant converter phases. The interleaved resonant converter phases may employ full-wave or half-wave switch-controlled capacitors. As described herein, switch-controlled capacitors are used to overcome load sharing problems associated with prior interleaved resonant converters. The methods and circuits provided herein enable interleaving of any number of resonant converter phases to expand power capacity of the power converter, and enable phase shedding to improve light load efficiency of the power converter. Embodiments include substantially constant switching frequency embodiments with, for example, full-wave SCC control (fSCC), which may be favourable in applications such as high-level system integration, and synchronized variable switching frequency embodiments with, for example, half-wave SCC control (hSCC). Such embodiments reduce component count and simplify the driving circuit, relative to embodiments with full-wave SCC control. Synchronized variable switching frequency fSCC and hSCC embodiments with a simplified master phase further reduce the component count.

Methods and circuits using full-wave and half-wave switch-controlled capacitors described herein may be applied to various resonant power converter topologies, such as, but not limited to, series resonant converters, parallel resonant converters, LLC resonant converters, and LCC resonant converters. As noted above, the LLC resonant converter provides high efficiency for front-end DC/DC conversion, and is becoming the predominant topology in many applications. Therefore, LLC embodiments will be described herein. However, it is to be understood that the methods and circuits may be adapted to other resonant converter topologies.

To improve the efficiency and the load capacity of resonant converters, interleaving of multiple phases (i.e., two or more phases) may be used. Interleaving provides desirable features including the following:

1. The load capacity of a resonant converter is limited by trade-offs of the resonant tank design. Higher load capacity can be achieved at the expense of increased circulating energy and/or increased component stress. Interleaving solves this problem by adding parallel phases to multiply the load capacity, while each phase remains an optimized design.

2. In high-current applications, the transformer becomes a major source of power loss because of the eddy current and the associated effects (AC loss) and the copper resistance of the transformer windings (DC loss). By splitting the current with multiple phases, both AC and DC losses can be mitigated.

3. In some resonant topologies, such as LLC and series resonant converters, the discontinuous nature of the output current imposes high RMS current on the output capacitors. Interleaving parallel phases cancels the current ripple and therefore reduces the required capacitor size and lowers the power loss on the equivalent series resistance (ESR).

4. Phase shedding may be used to improve light-load efficiency and obtain a relatively flat load-efficiency curve.

Interleaved resonant converters provided herein overcome the aforementioned load sharing problem while maintaining the benefits of interleaving. As described herein, the power capacity may be expanded by paralleling multiple phases, and light-load efficiency may be improved by phase shedding, i.e., by shutting down one or more power stages during light load conditions. As such, interleaved resonant converter embodiments as described herein represent a substantial improvement over currently known designs.

An interleaved LLC resonant converter as described herein includes at least one switch-controlled capacitor (SCC) in each phase, which is used to regulate each LLC phase. In one embodiment, full-wave SCCs (fSCCs) compensate for gain differences among phases caused by component tolerances, and also regulate the output voltage. Each LLC phase uses its resonant frequency as a control variable, instead of the switching frequency. As a result, regulation is done in individual phases when the switching frequencies of all phases are substantially constant and substantially identical. This advantageously provides a simple interleaving structure, and enables implementation of load sharing and phase shedding. The overall load capacity may be expanded by paralleling an arbitrary number of phases. The fixed switching frequency is favourable for higher level integration.

In some embodiments one or more half-wave SCC (hSCC) or fSCC may be used in each LLC phase as an independent variable for load sharing control. As noted above, all LLC stages are synchronized at the same switching frequency, whereas the switching frequency is used as a variable to regulate the output voltage. The hSCC or fSCC compensates for gain differences among phases caused by component tolerances.

In some embodiments the fSCC or hSCC may be omitted in a master phase by setting the output current of other phases according to the master phase.

As noted above, methods and circuits described herein, including fSCC and hSCC with either substantially constant or variable switching frequency, and with or without a simplified master phase, may be extended to other types of resonant topologies to address load sharing and gain advantages of interleaved operation.

As used herein, the term "modulate" is intended to mean control, change, adjust, or vary.

As used herein, the terms "constant" and "fixed" are considered to be equivalent, and are used to refer to a value that does not undergo an intended change or a substantial change (e.g., "substantially constant" or "substantially fixed") that would affect a desired performance of a circuit or system.

1. Interleaved fSCC-LLC Resonant Converter with Constant Switching Frequency

1.1. Full-Wave Switch-Controlled Capacitor Operation

A full-wave switch-controlled capacitor (fSCC) as proposed in [4] is shown in FIG. 1(a), and includes a bi-directional switch with anti-parallel diodes (which may be discrete diodes and/or body diodes of the switches), such as, but not limited to a pair of drain-to-drain connected MOSFETs $S_1$, $S_2$ and their body diodes, and a parallel capacitor $C_a$. The switches are used to control the charge of the capacitor in each half-switching-cycle, and therefore modulate (i.e., control the value of) the equivalent capacitance. The control scheme proposed in [4] results in the anti-parallel diodes carrying current, causing energy loss.

Figure 2A:
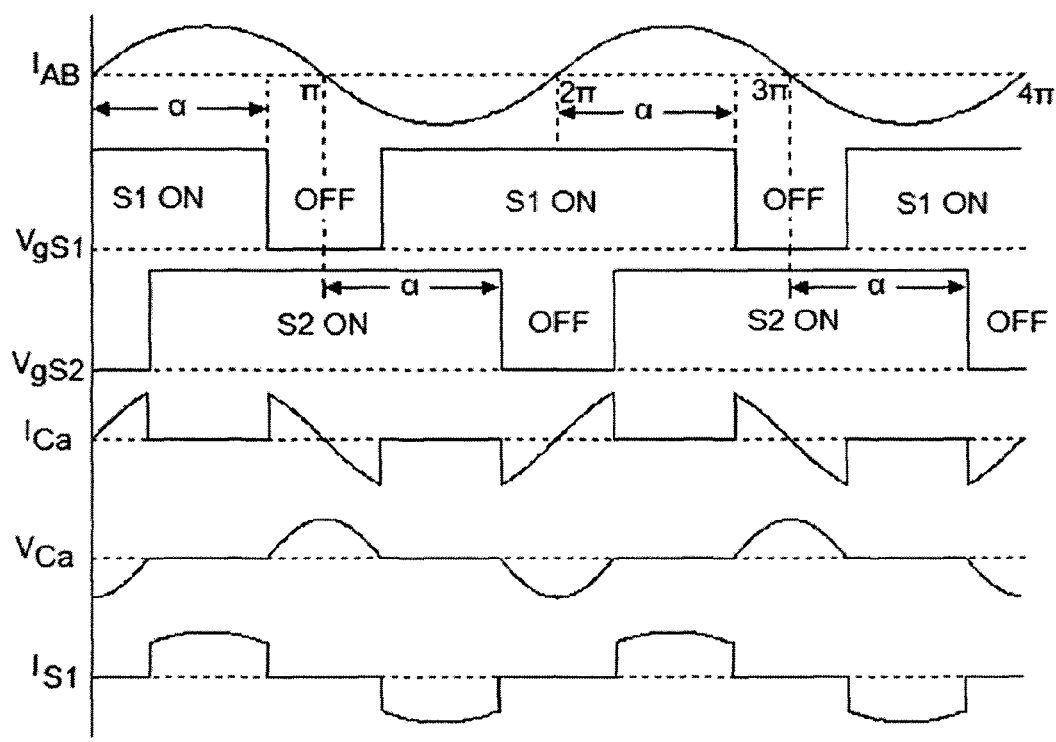
FIG. 2(a) is a plot of the waveforms of the fSCC embodiment of FIG. 1(a)

Provided herein is an improved driving scheme for the fSCC of FIG. 1(a) that prevents the MOSFET body diodes from carrying current. Operation of the driving scheme is described below with reference to the exemplary waveforms shown in FIG. 2(a).

When a sinusoidal current is applied to the fSCC, the current zero-crossing points are at angle 0, π, 2π . . . etc. For a positive half-cycle where the current flows from A to B, the gating signal of $S_1$ is synchronized at $2n\pi$ ($n \in N$), and turns off $S_1$ at angle $2n\pi + \alpha$, where $\pi/2 < \alpha < \pi$. The current then flows from A to B via $C_a$ and charges the capacitor voltage until the angle $(2n+1)\pi$. At the angle $(2n+1)\pi$, the current reverses direction, and begins to discharge $C_a$. After $C_a$ is fully discharged, and negative current is about to flow from B to A via the body diode of $S_1$, $S_1$ is turned on again to prevent the body diode from carrying current. $S_1$ remains on for the rest of the cycle and turns off again at angle $(2n+2)\pi + \alpha$, which is α angle past the next sync point $(2n+2)\pi$. $S_2$ controls the negative half-cycle and follows the same procedure, except the sync point is at $(2n+1)\pi$. It is noted from FIG. 2(a) that both $S_1$ and $S_2$ are switched on and off under ZVS conditions. The voltage amplitude of $C_a$ may be designed below 100V, thus low on-resistance MOSFETs may be used and the power loss is negligible.

The equivalent capacitance of the fSCC, $C_{SC}$, is modulated by the turn-off angle α, given in Equation (1).

$$C_{SC} = \frac{C_a}{2 - (2\alpha - \sin 2\alpha)/\pi} \quad (1)$$

Figure 3A:
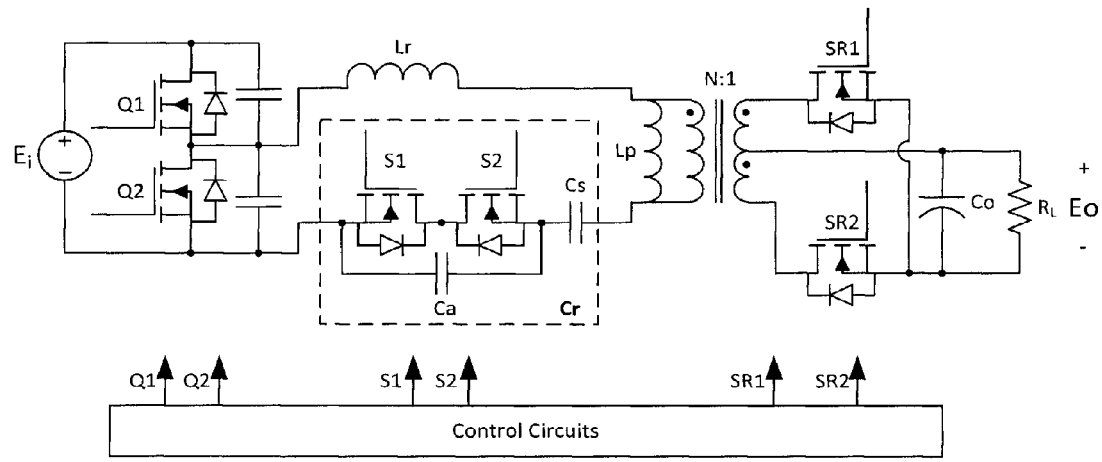
FIG. 3(a) is a schematic diagram of an fSCC-LLC resonant converter according to one embodiment.

1.2. Design and Analysis of Constant Switching Frequency fSCC-LLC Resonant Converter A full-wave switch-controlled capacitor LLC resonant converter (fSCC-LLC) according to one embodiment is shown in FIG. 3(a). The fSCC ($S_1$, $S_2$ and their body diodes, and parallel capacitor $C_a$) is connected in series with the resonant tank ($L_r$, $L_p$, $C_s$) in order to control the equivalent resonant capacitance, $C_r$, and thus to control the resonant frequency. The voltage gain of the LLC converter is modulated by the ratio of the switching frequency to the resonant frequency through a feedback control circuit. Similar to conventional LLC resonant converters with a fixed switching frequency, varying the resonant frequency can also modulate the voltage gain, which is accomplished by controlling the switching angle α in the fSCC.

One way that a constant switching frequency LLC differs from a variable-switching frequency LLC is in the variation of the parallel inductance current for the ZVS condition throughout the load range. For variable switching frequency LLC, the peak parallel inductance current is selected so as to fulfill the ZVS condition when it is operating at the resonant frequency. At a heavier load, the switching period will be longer and thus the parallel inductance current will be larger at the switching point, therefore the ZVS condition is ensured. In comparison, for a constant switching frequency LLC, the resonant frequency will increase under a heavier load while the switching period does not change; consequently the parallel inductance current will be smaller at the switching point. To ensure ZVS for all load conditions, the design is based on the full load scenario as the worst case. There are also many other aspects of the fixed-switching frequency LLC that are different from that of the variable-switching frequency LLC. Therefore the design procedure is different. The following design steps for constant switching frequency LLC consider the series capacitance, $C_s$, and the fSCC as one resonant capacitance, $C_r$, as shown in FIG. 3(a).

The first step is to determine the switching frequency, $\omega_s$, in radians, and the transformer turns ratio, N. The turns ratio is selected such that the gain of the LLC resonant tank is above unity during normal operation.

For a half-bridge SCC-LLC, the peak gain required for a minimum input voltage is $$M_{pk} = \frac{NE_o}{\eta E_{i,min}/2} \quad (2)$$

where η is the efficiency, $E_{i,min}$ is the minimum input voltage, and $E_o$ is the output voltage.

Similarly, the nominal gain required for a nominal input voltage is $$M_{nom} = \frac{NE_o}{\eta E_{i,nom}/2} \quad (3)$$

The next step is to determine the parallel inductance, $L_p$, which may also be the magnetizing inductance of the transformer. As can be seen below, $L_p$ determines not only the ZVS condition but also the peak gain. Therefore, two constraints apply for $L_p$: full-load ZVS condition and the peak gain requirement. Usually the peak gain requirement is more restrictive, but for applications that require low peak gain, the full-load ZVS condition can be dominant. Thus, $L_p$ must be calculated for both constraints, and the value that can fulfill both conditions selected.

The derivation for the full-load ZVS constraint is as follows: Let $I_{ZVS}$ be the resonant current at the switching instant and $\omega_{FL}$ be the resonant frequency at full load. Assume the resonant current rises from $-I_{ZVS}$ to $I_{ZVS}$ linearly within time $\pi/\omega_{FL}$, and remains approximately unchanged for the rest of the half-cycle, then:

$$I_{ZVS} = \frac{NE_o \pi}{2L_p \omega_{FL}} \quad (4)$$

$I_{ZVS}$ should be sufficient to charge and discharge the MOSFET junction capacitance $C_j$ within dead time $t_d$, thus:

$$I_{ZVS} \geq \frac{2E_i C_j}{t_d} \quad (5)$$

Combine (4) and (5):

$$L_p \leq \frac{t_d \pi N E_o}{4 \omega_{FL} E_i C_j} \quad (6)$$

Equation (6) defines the required $L_p$ for full-load ZVS. At this point, $\omega_{FL}$ is unknown.

The derivation for the peak gain constraint is as follows: Use the Fundamental Harmonic Approximation (FHA) approach to calculate the gain of the resonant tank and yield:

$$M(\omega_i) = \frac{1}{\sqrt{\left(\frac{\omega_i^2 - 1}{K} - 1\right)^2 + \frac{\pi^4 \omega_s^2 L_p^2}{64 N^4 R_L^2}\left(\frac{\omega_i^2 - 1}{K}\right)^2}} \quad (7)$$

where K is the inductance ratio, $L_p/L_r$; $R_L$ is the load resistance, and $\omega_i$ is the resonant frequency normalized at the switching frequency. The notation "i" stands for inverse normalization as oppose to that in variable-switching frequency LLC where switching frequency often be normalized at the resonant frequency.

Let $$X = \frac{\omega_i^2 - 1}{K} \text{ and } C = \frac{\pi^4 L_p^2 \omega_s^2}{64 N^4 R_L^2},$$

Equation (7) can be rewritten as:

$$M(X) = \frac{1}{\sqrt{(X-1)^2 + CX^2}} = \frac{1}{\sqrt{(1+C)X^2 - 2X + 1}} \quad (8)$$

The denominator in (8) is a parabolic function; therefore the peak gain can be solved as:

$$M_{pk} = \sqrt{\frac{C+1}{C}} \text{ when } X = \frac{1}{1+C} \quad (9)$$

Further derivation from (9) yields the following relations:

$$M_{pk} = \sqrt{\frac{64 N^4 R_L^2}{\pi^4 L_p^2 \omega_s^2} + 1} \quad (10)$$

$$\omega_{iPK} = \sqrt{K + 1 - \frac{K}{M_{pk}^2}} \quad (11)$$

$$L_p = \frac{8 N^2 R_L}{\pi^2 \omega_s \sqrt{M_{pk}^2 - 1}} \quad (12)$$

where $\omega_{iPK}$ is the normalized resonant frequency at which the peak gain is obtained.

Equation (10) reveals that the peak gain of constant switching frequency SCC-LLC is solely determined by $L_p$ and is independent from K. Equation (11) shows that the K only determines where the peak gain occurs. These conclusions can be observed from the plots drawn using (7), in FIG. 4 and FIG. 5.

Equation (12) is then used to calculate $L_p$ according to the peak gain requirement. The $L_p$ value according to the full-load ZVS condition will be solved after K is selected in the next step.

Figure 4:
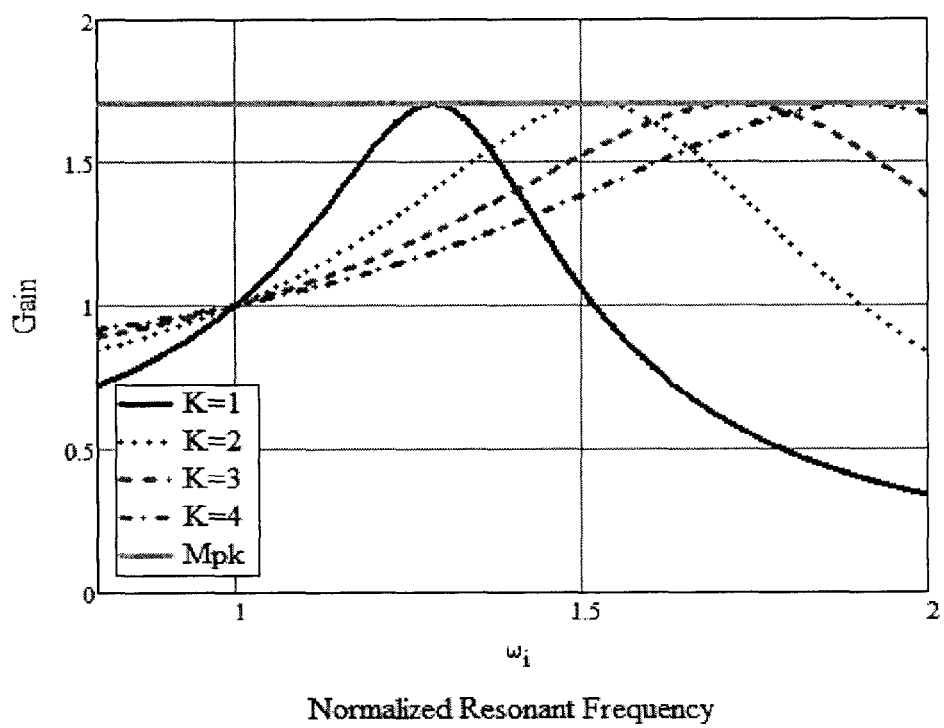
FIG. 4 is a plot showing gain as a function of normalized resonant frequency for various values of inductance ratio K of a LLC resonant tank circuit, in constant switching frequency scheme.
Figure 5:
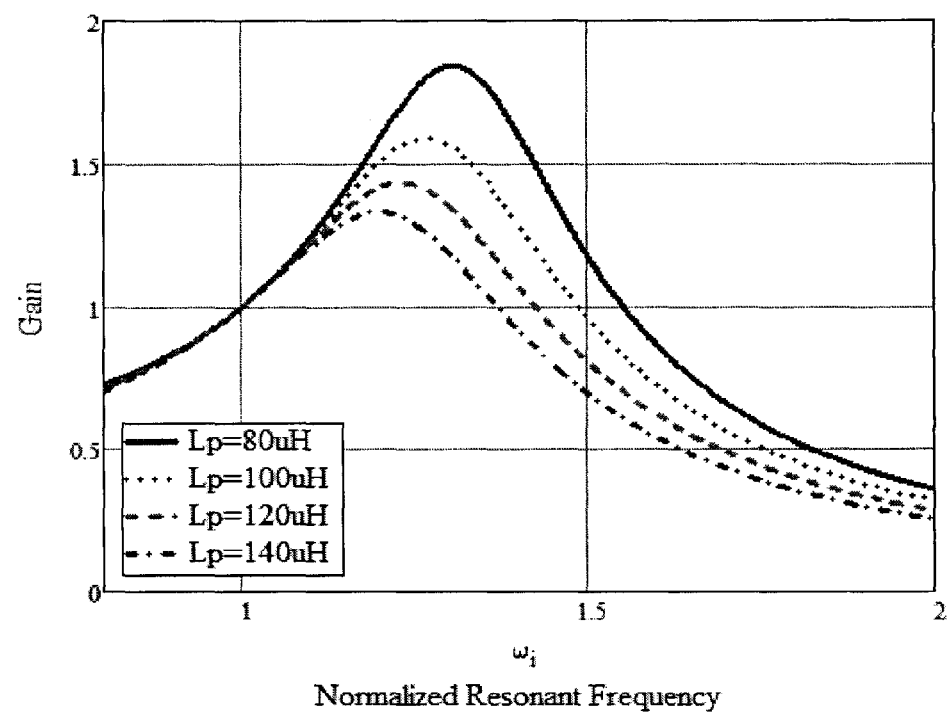
FIG. 5 is a plot showing gain as a function of normalized resonant frequency for various values of inductance $L_p$ of a LLC resonant tank circuit, in constant switching frequency scheme.

FIG. 4 shows that, the smaller the K, the steeper the gain slope, thus the less the operating resonant frequency deviates from the switching frequency. However, in contrast with that in variable-switching frequency LLC, a small K in constant switching frequency LLC does not result in less primary RMS current. In fact, when K is larger, the primary RMS current is slightly smaller. This is because the switching period is fixed, and with a larger K, the resonant frequency must be higher to achieve the same gain, which yields shorter resonance time for the $L_p$ current to build up linearly. Nevertheless, a higher resonant frequency will cause the secondary RMS current to be higher, which is much more significant than the primary RMS current change. So from the RMS current point of view, there are still advantages of using a small K value.

However, the selection of K should also take into account the magnetic design and the resonant capacitor voltage. A small K indicates a large resonant inductance, which may be difficult to implement using the transformer leakage inductance. Also, a large resonant inductor indicates a small resonant capacitance and high quality factor; thus the SCC voltage stress will be high, and high voltage rating MOSFETs must be used. Because high-voltage MOSFETs have high on-resistance, the primary-side conduction loss will be increased.

With the above considerations, different K values may be tested in the following steps to find a proper trade-off:

In (8), the variable X can be solved as:

$$X = \frac{1 \pm \sqrt{\frac{1+C}{M^2} - C}}{1+C} \quad (13)$$

Then $\omega_i$ can be solved as:

$$\omega_i = \sqrt{KX+1} = \sqrt{\frac{K \pm K\sqrt{\frac{1+C}{M^2} - C}}{1+C} + 1} \quad (14)$$

The $\omega_i$ has two roots. The smaller root is chosen because it is in the ZVS region; the larger root is in the ZCS region. Thus, the normalized resonant frequency at full load/nominal input voltage can be calculated by plugging in corresponding gain and load resistor values.

$$\omega_{iFL} = \sqrt{\frac{K - K\sqrt{\frac{1+C}{M_{nom}^2} - C}}{1+C} + 1} \quad (15)$$

Then the peak capacitor voltage can be estimated using the equation below:

$$v_{Cr,max} = \left[\frac{E_o \pi}{R_L N \omega_s} + \frac{NE_o}{2L_p} \cdot \frac{\pi}{\omega_i \omega_s}\left(\frac{\pi}{\omega_s} - \frac{3\pi}{4\omega_i \omega_s}\right)\right] \cdot \frac{(\omega_i \omega_s)^2 L_p}{2K} + \frac{E_i}{2} \quad (16)$$

Plug in $E_i = E_{i,nom}$, $\omega_i = \omega_{iFL}$ and $E_i = E_{i,min}$, $\omega_i = \omega_{iPK}$ to calculate the peak resonant capacitor voltage as both cases can be the worst case.

It is found that K=7 is a reasonable trade-off for integrated resonant inductance. A smaller K value is better for external resonant inductance.

It is noted that the equations derived from FHA are less accurate when the resonant frequency is further from the switching frequency, where the resonant current is no longer a sinusoidal shape. As a result, the $L_p$ calculated from (12) may provide a larger peak gain than designed, hence the actual worst-case resonant frequency and peak capacitor voltage will be smaller than that calculated from (11) and (16). This inaccuracy will result in over-design rather than under-design. Nevertheless, simulation tools may be used for verification.

Now use the normalized resonant frequency $\omega_{iFL}$ calculated from (15), convert into the actual resonant frequency $\omega_{FL}$, and substitute into (6) to verify the full-load ZVS constraint for the $L_p$ value designed from (12). If the ZVS constraint is tighter, use (17) to determine $L_p$, then repeat the aforementioned design process to find K.

$$L_p = \frac{t_d \pi N E_o}{4\omega_{FL} E_i C_j} \quad (17)$$

Once $L_p$ and K are selected, $L_r$ is also determined.

$$L_r = \frac{L_p}{K} \quad (18)$$

Once $L_p$ and $L_r$ are determined, the fSCC parameters can be designed using the following steps.

The fSCC is connected in series with a series capacitor, $C_s$, to modulate the resonant capacitance $C_r$. The fSCC equivalent capacitance, $C_{SC}$, is given in (1). The total equivalent resonant capacitance, $C_r$, can be calculated using (19):

$$C_r = \frac{C_{SC} C_s}{C_{SC} + C_s} \quad (19)$$
$$= \frac{\pi C_a C_s}{\pi C_a + 2\pi C_s - 2\alpha C_s + C_s \sin(2\alpha)}$$

where $$\frac{\pi}{2} \leq \alpha \leq \pi.$$

Substituting (19) into (7), the gain expression for constant switching frequency fSCC-LLC as a function of the control angle α can be derived in (20).

$$M(\alpha) = \frac{K}{\sqrt{\left(\frac{\pi C_a + 2\pi C_s - 2\alpha C_s + C_s \sin(2\alpha)}{\omega_s^2 L_r \pi C_a C_s} - K - 1\right)^2 + \frac{\pi^4 L_p^2 \omega_s^2}{64 N^4 R_L^2}\left(\frac{\pi C_a + 2\pi C_s - 2\alpha C_s + C_s \sin(2\alpha)}{\omega_s^2 L_r \pi C_a C_s} - 1\right)^2}} \quad (20)$$

The first step in SCC design is to determine the objective minimum and maximum equivalent capacitance. The minimum equivalent capacitance is determined by the resonant frequency at which the peak gain is achieved.

$$C_{r,min} = \frac{1}{(\omega_s \omega_{iPK})^2 L_r} \quad (21)$$

The maximum equivalent capacitance is determined by the resonant frequency at which the burst mode will be triggered. For example, if the converter enters burst mode at 5% load, the resonant frequency can be calculated using (22), where $R_{L5\%}$ is the load resistance at 5% load.

$$\omega_{i5\%} = \sqrt{\frac{K - K\sqrt{\frac{1+C}{M^2} - C}}{1+C} + 1} \quad (22)$$

where $$C = \frac{\pi^4 L_p^2 \omega_s^2}{64 N^4 R_{L5\%}^2}$$

Then the maximum equivalent capacitance may be calculated using (23).

$$C_{r,max} = \frac{1}{(\omega_s \omega_{i5\%})^2 L_r} \quad (23)$$

The next step is to determine the maximum and the minimum control angle of the SCC. Theoretically, the angle α is from 0.5π to π. Then the values of $C_s$ and $C_a$ can be calculated using (24) and (25).

$$C_s = C_{r,max} \quad (24)$$

$$C_a = \frac{C_s C_{r,min}}{C_s - C_{r,min}} \quad (25)$$

However, to ensure the reliability of the driving scheme, $\alpha_{max}$ may be set slightly below π and $\alpha_{min}$ slightly above 0.5π. As discussed above, the design procedure for constant switching frequency LLC based on FHA tends to provide an over-design of the peak gain, which automatically leaves some margin for $\alpha_{min}$. Therefore, $\alpha_{min}$=0.5π can be considered to have a margin already, and only $\alpha_{max}$ needs an additional margin from the theoretical maximum value π.

Figure 6:
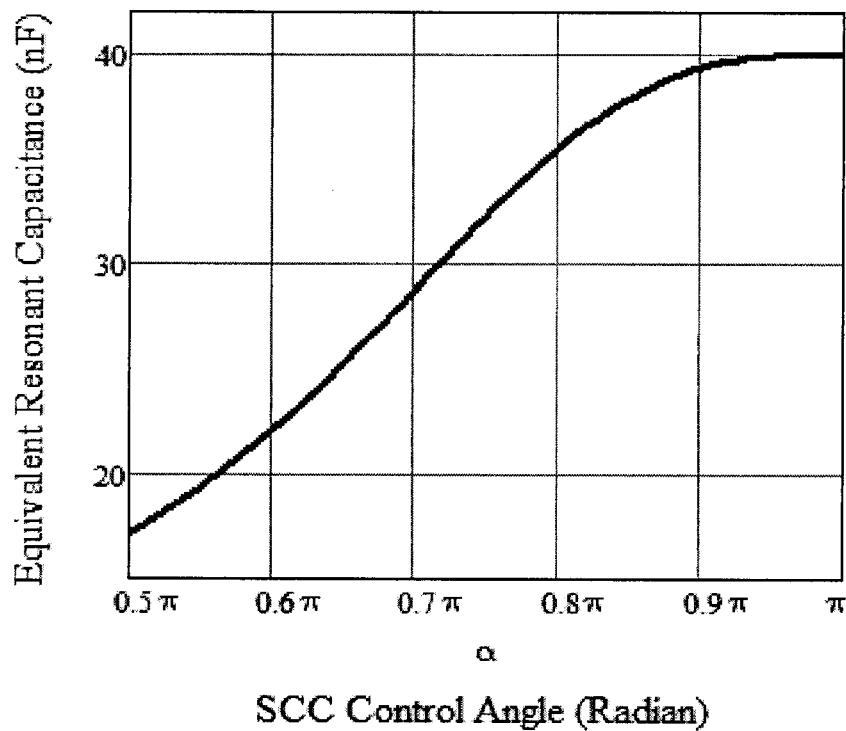
FIG. 6 is a plot of equivalent resonant capacitance as a function of the fSCC control angle.

A further observation of the relation between the SCC control angle α and the equivalent resonant capacitance $C_r$ in (19) is shown in FIG. 6, wherein the curve becomes flat when a is above 0.9π. This characteristic is inherent in (19), and is generally true for most designed $C_r$ and $C_a$ values. Hence, because the flat curve indicates a reduction of the system gain, $\alpha_{max}$ may be selected below 0.9π to ensure proper dynamic performance.

The final step of SCC design is to solve for $C_s$ and $C_a$, by substituting values of $C_{r,max}$, $\alpha_{max}$ and $C_{r,min}$, $\alpha_{min}$ into (19), respectively, as in Equations (26) and (27).

Figure 7:
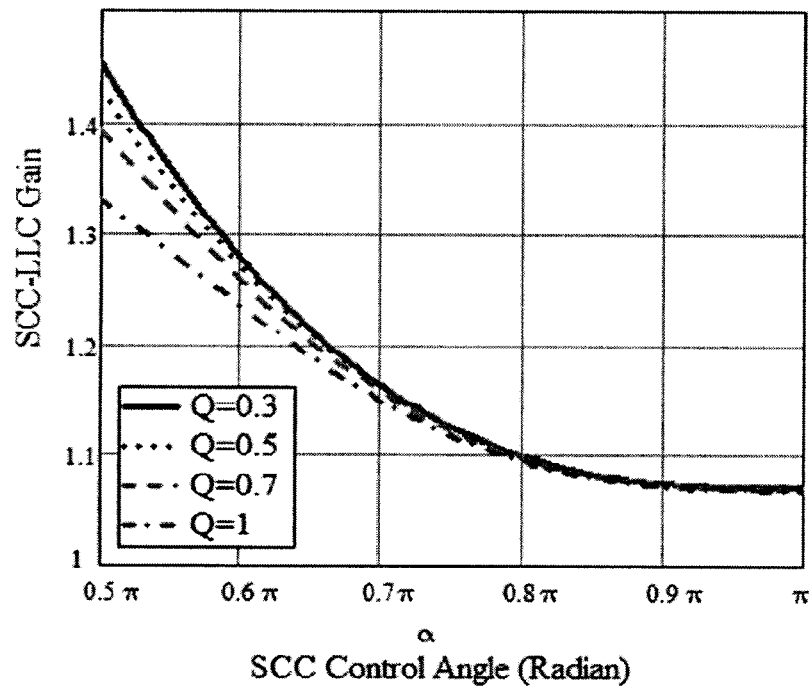
FIG. 7 is a gain plot of constant switching frequency fSCC-LLC as a function of the fSCC control angle.

Finally, the relation between the SCC control angle and the SCC-LLC gain is plotted in FIG. 7 using (20).

It may be desirable to have the peak SCC voltage less than 100V so that low on-resistance MOSFETs may be used. If the design result does not meet the requirement, iterations of the design procedure may be needed. In general, because the series capacitor and the SCC capacitor split the voltage stress, the above-mentioned requirement is not difficult to meet.

$$C_a = \frac{[\sin(2\alpha_{min}) - \sin(2\alpha_{max}) + 2\alpha_{max} - 2\alpha_{min}]C_{r,min}C_{r,max}}{(C_{r,max} - C_{r,min})\pi} \quad (26)$$

$$C_s = \frac{[\sin(2\alpha_{min}) - \sin(2\alpha_{max}) + 2\alpha_{max} - 2\alpha_{min}]C_{r,min}C_{r,max}}{(2\alpha_{max} - \sin(2\alpha_{max}) - 2\pi)C_{r,max} + (\sin(2\alpha_{min}) - 2\alpha_{min} + 2\pi)C_{r,min}} \quad (27)$$

The above-discussed constant switching frequency fSCC-LLC may be single-phase or multiphase.

Embodiments are further described by way of the following non-limiting Example.

1.3. Example 1

A 600 W two-phase interleaved constant switching frequency fSCC-LLC was assembled. The schematic diagram is shown in FIG. 8(*a*), and the circuit parameters are given in Table 1.

TABLE 1

Figure 8A:
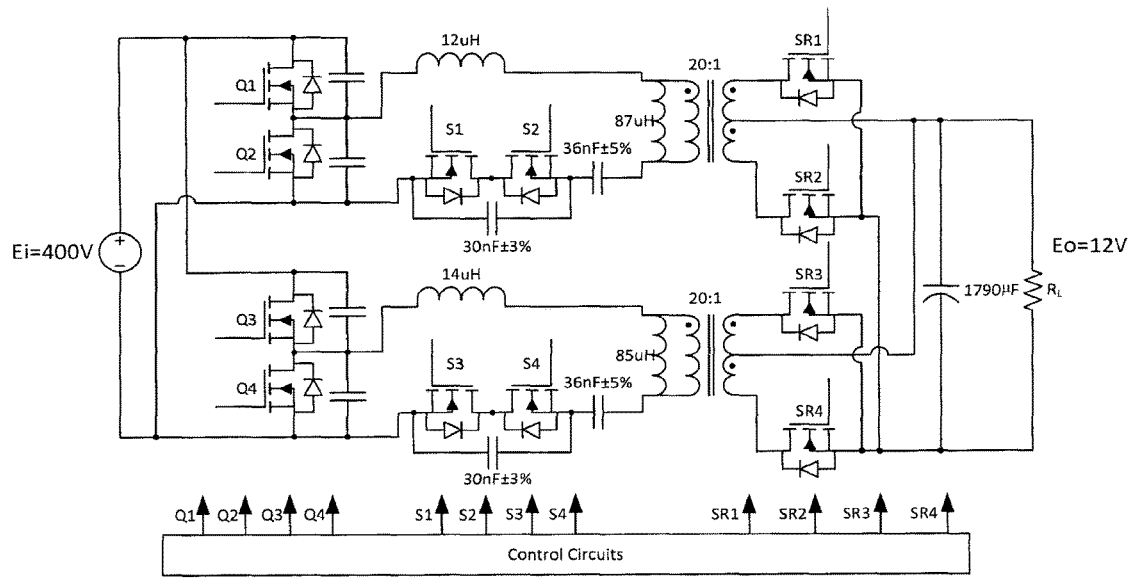
FIG. 8(a) is a schematic of a two-phase interleaved SCC-LLC resonant converter according to an embodiment as tested in Example 1.

Parameters of the Circuit of FIG. 8(a)

| | |
|---|---|
| Switching frequency | 200 kHz |
| Input Voltage | 400 V nominal/300 V minimum |
| Output Voltage | 12 V |
| Output Power | 300 W × 2 |
| Transformer Turns Ratio | 20:1, center tapped |
| Magnetizing Inductance | 87 µH (Phase1) 85 µH (Phase2) |
| Resonant Inductance | 12 µH (Phase1) 14 µH (Phase2) |
| Series Capacitance | 36 nF ± 5% |
| SCC Capacitance | 30 nF ± 3% |
| Output Capacitance | 1790 µF (100 µF × 8,330 µF × 3) |
| Half-bridge MOSFET | Infineon IPB60R190C6 |
| SCC MOSFET | Infineon BSC060N10NS3 G |
| SR MOSFET | Infineon BSC011N03LS |

The resonant inductors of the two phases use leakage inductance of the transformer and are intentionally selected to be non-identical. The resonant capacitors also have tolerances; therefore the SCC is used to balance the output current. Phase 2 (Q3/Q4) had a 90° phase shift with respect to Phase 1 (Q1/Q2).

A digital signal controller, dsPIC33FJ32GS606 (Microchip Technology Inc., Chandler, Ariz.), was used to implement the digital controller. The pulse width modulation (PWM) of the SCC was synchronized with the primary current zero-crossing points using the External PWM Reset (XPRES) function, which allows current transformers to send a signal to reset the PWM every time the current crosses zero.

The load sensing method was adapted from [5], but may also be implemented other ways. A slow load sharing loop was implemented digitally.

Figure 9:
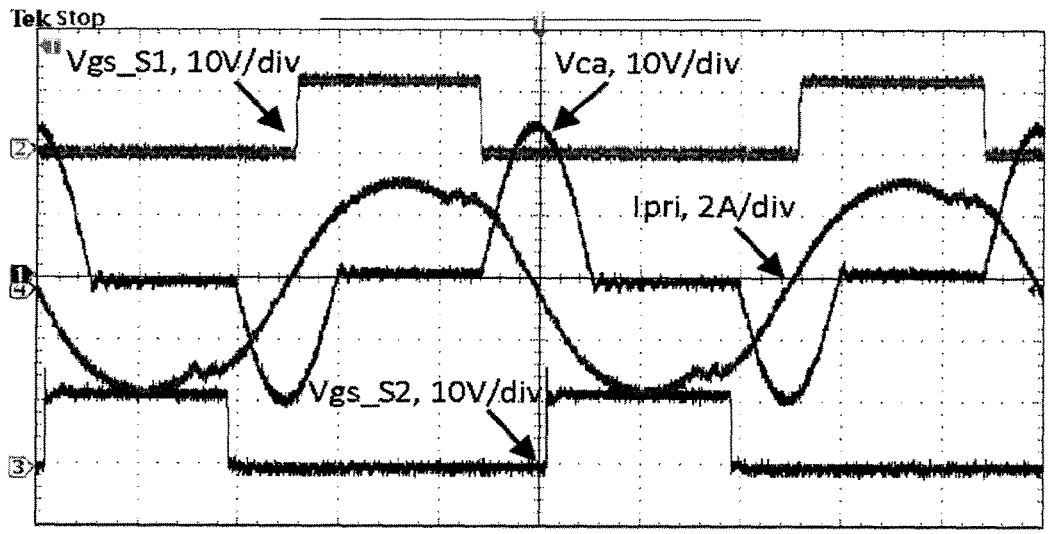
FIG. 9 is a plot showing performance of the fSCC-LLC embodiment of FIG. 8(a) at an output current of 20 A and a control angle of 131°.
Figure 10:
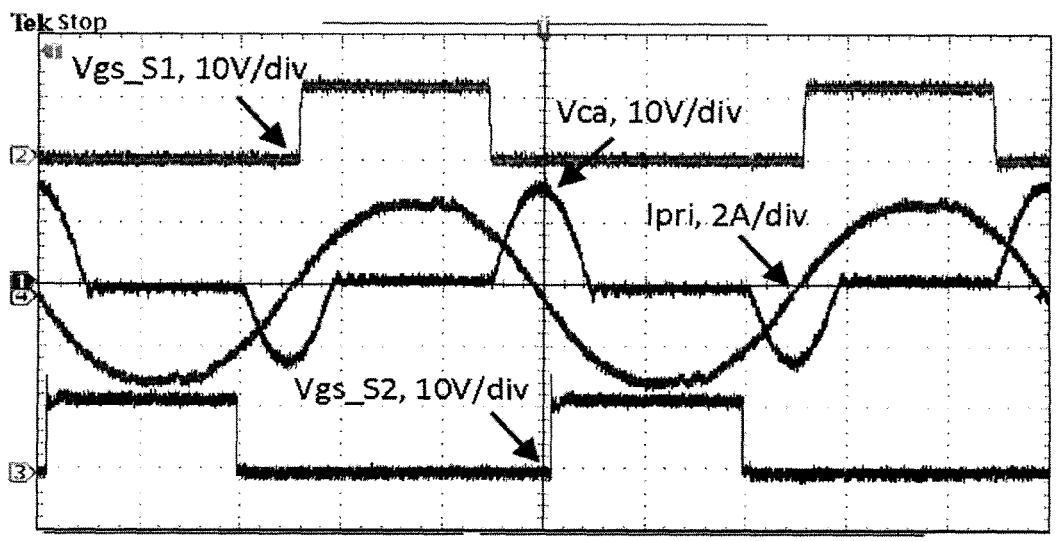
FIG. 10 is a plot showing performance of the SCC-LLC embodiment of FIG. 8(a) at an output current of 10 A and a control angle of 136°.

FIGS. 9 and 10 show the effectiveness of SCC modulation. $V_{ca}$ is the voltage of $C_a$; $V_{gs\_S1}$ is the gating signal of $S_1$; $V_{gs\_S2}$ is the gating signal of $S_2$; Ipri is the primary current. FIG. 9 shows a 20 A output current scenario where the control angle α is 131°. FIG. 10 shows a 10 A output current scenario where the control angle α is 136°.

Figure 11:
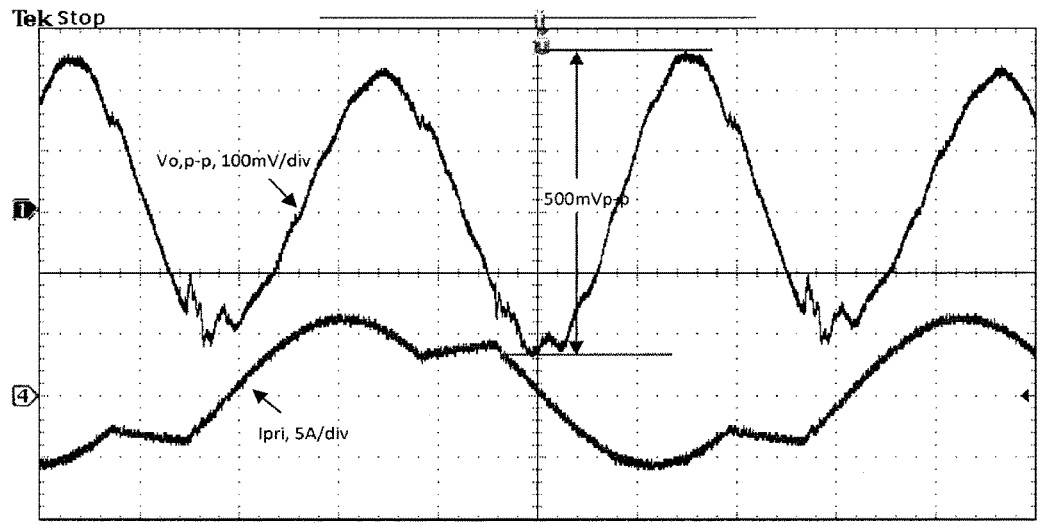
FIG. 11 shows waveforms of a 600 W single-phase LLC converter, with identical output capacitance used in the embodiment of FIG. 8(a), wherein the output voltage ripple is 500 mV at full load current of 50 A.
Figure 12:
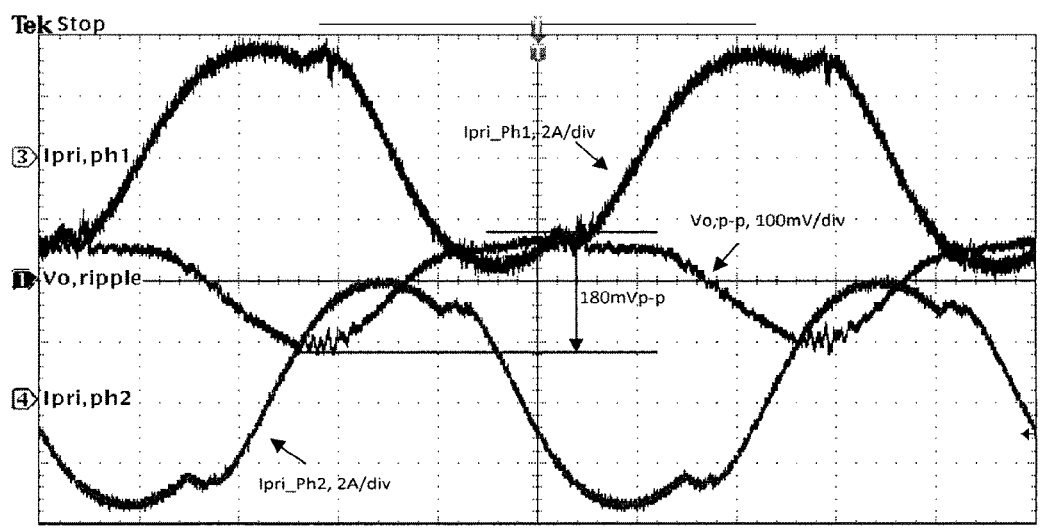
FIG. 12 shows the effectiveness of current ripple cancellation and load sharing for the two phase embodiment of FIG. 8(a) at full load current of 50 A, wherein the output voltage ripple is 180 mV.

FIG. 11 and FIG. 12 show the effectiveness of the current ripple cancellation and the load sharing. Vo,p-p is the output ripple voltage, AC coupled; Ipri is the single-phase primary current; Ipri_ph1 is the primary current of Phase 1; Ipri_ph2 is the primary current of Phase 2. The output current is 50 A in both figures. FIG. 11 shows the waveforms of a comparable 600 W single-phase LLC converter, with identical output capacitance used in FIG. 8(*a*). The output voltage ripple is 500 mV peak to peak. FIG. 12 shows the waveforms of the two-phase interleaved constant switching frequency fSCC-LLC converter. The output voltage ripple is reduced to 180 mV peak to peak. The ripple cancellation can perform even better if external resonant inductors are used, which will make the resonant inductance of the two half-switching cycles better symmetrical. FIG. 12 also proves that the output current of the two phases are very well balanced.

Figure 14:
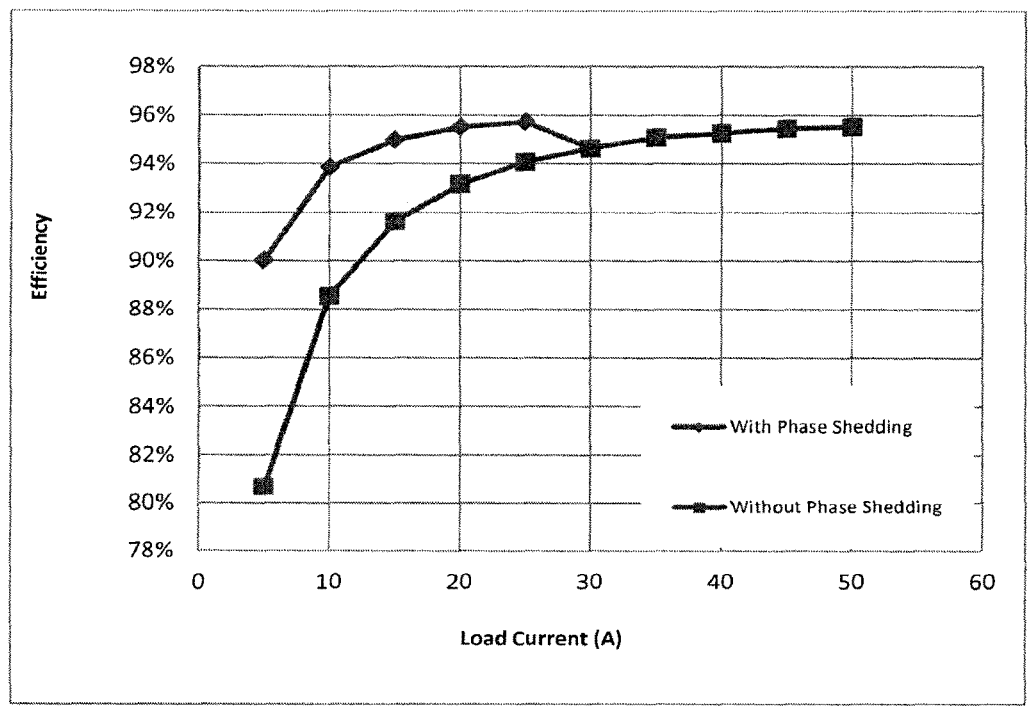
FIG. 14 is an efficiency curve for the two-phase embodiment of FIG. 8(a) without phase shedding.

FIG. 14 shows the efficiency curves of the two-phase interleaved constant switching frequency fSCC-LLC with and without phase shedding. It is shown that the heavy load efficiency approaches 96%; and with phase shedding, the 5 A load efficiency is improved from 81% to 90%.

2. Interleaved hSCC-LLC Resonant Converter with Variable Switching Frequency

2.1. Introduction

Similar to the constant switching frequency fSCC-LLC described above, a half-wave SCC (hSCC) may be used with a LLC resonant converter as an independent variable for load sharing control.

In hSCC-LLC embodiments, phases are synchronized at substantially identical switching frequency, where the switching frequency is variable to regulate the output voltage. Because the modulation of hSCC is unipolar, the waveforms of the two half-switching cycles are asymmetrical. This asymmetry effect is acceptable when the hSCC is only responsible for compensating differences caused by component tolerances (load sharing). The switching frequency is the control variable for voltage regulation, as in conventional LLCs. Compared to fSCC-LLC embodiments described above, hSCC-LLC embodiments feature lower cost (fewer power MOSFETs and driver ICs), simpler driving circuits (no floating source node), and simpler controller (fewer PWM modules). However, hSCC-LLC embodiments do not have constant switching frequency like SCC-LLC embodiments, which may be preferred for higher-level integration, such as in distributed power architecture.

2.2. Half-Wave Switch-Controlled Capacitor Operation

Figure 1B:
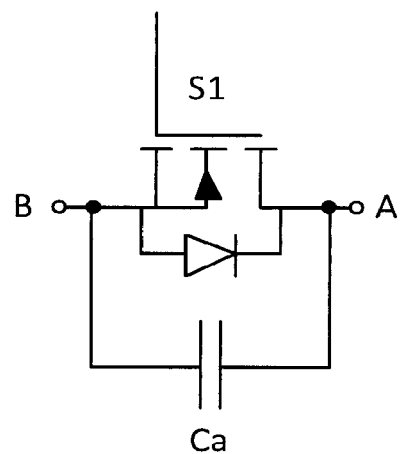
FIG. 1(b) is a schematic diagram of a half-wave switch-controlled capacitor (hSCC) according to one embodiment.

A half-wave SCC (hSCC) was proposed in [4]. An embodiment of an hSCC is shown in the schematic of FIG. 1(b). The embodiment includes one switch, in this embodiment a MOSFET $S_1$, shown with its body diode, and one parallel capacitor, $C_a$. The switch is used to control the charge of the capacitor in one of two half-cycles within a full cycle, and therefore to modulate the equivalent capacitance. The control scheme proposed in [4] results in the anti-parallel diode carrying current, causing energy loss.

Figure 2B:
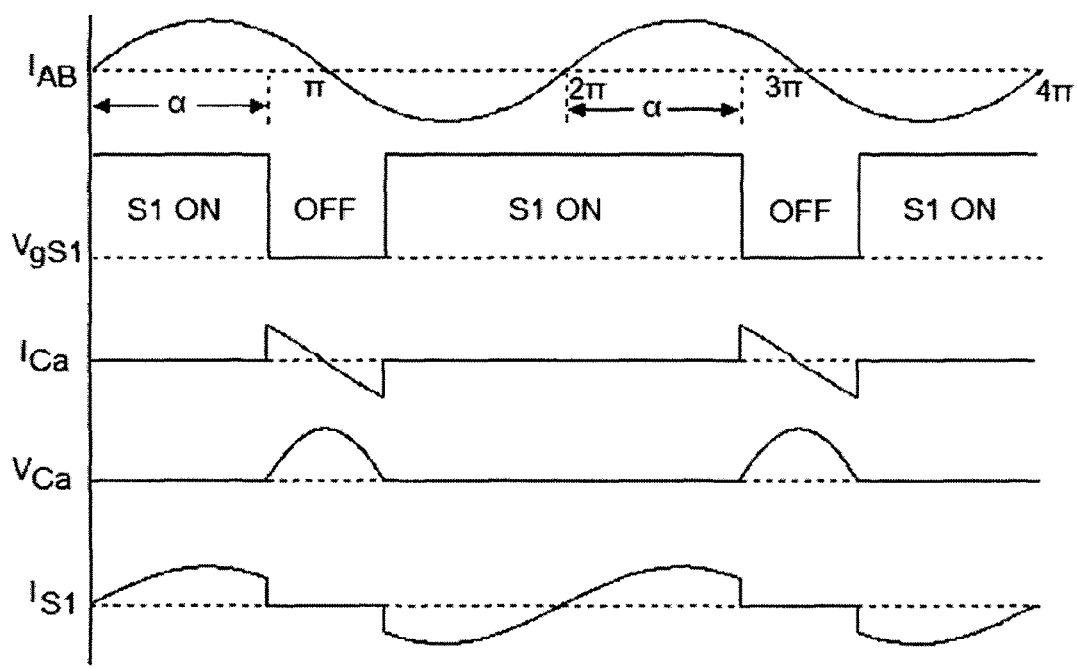
FIG. 2(b) is a plot of the waveforms of the hSCC embodiment of FIG. 1(b)

Provided herein is an improved driving scheme for an hSCC such as the embodiment shown in FIG. 1(b) that prevents the MOSFET body diode from carrying current. Operation is described below with reference to the exemplary waveforms shown in FIG. 2(b).

When a sinusoidal current is applied to the hSCC, the current zero-crossing points are at angle 0, $\pi$, $2\pi$ . . . etc. For each full cycle, the gating signal of $S_1$ is synchronized at $2n\pi$ ($n \in \mathbb{N}$), and turns off $S_1$ at angle $2n\pi+\alpha$, where $\pi/2 < \alpha < \pi$. The current then flows from A to B via $C_a$ and charges the capacitor voltage until the angle $(2n+1)\pi$. At the angle $(2n+1)\pi$, the current reverses direction, and begins to discharge $C_a$. After $C_a$ is fully discharged, and the negative current is about to flow from B to A via the body diode of $S_1$, $S_1$ is turned on again to prevent the body diode from conducting. $S_1$ remains on for the rest of the cycle and turns off at angle $(2n+2)\pi+\alpha$, which is $\alpha$ angle past the next sync point $(2n+2)\pi$. It is noted that $S_1$ is switched both on and off at ZVS condition. The voltage amplitude of $C_a$ may be very low because load sharing only requires a limited modulation range, thus very low on-resistance MOSFETs may be used and the power loss is negligible.

2.3. Half-Wave SCC-LLC Resonant Converter

Figure 3B:
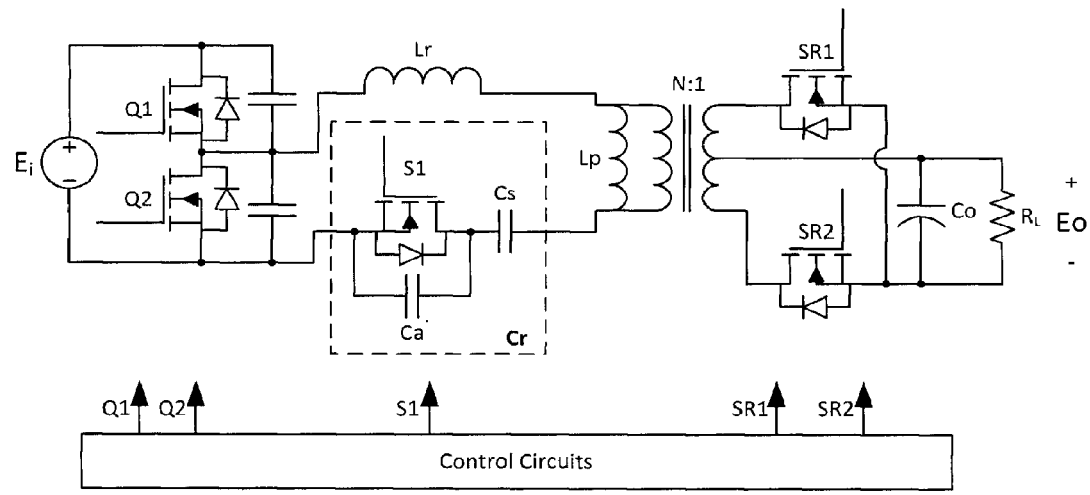
FIG. 3(b) is a schematic diagram of an hSCC-LLC resonant converter according to one embodiment.

An embodiment of an hSCC-LLC is shown in FIG. 3(b). The hSCC ($S_1$, shown with its body diode, and parallel capacitor, $C_a$) is connected in series with the resonant tank to modulate the equivalent resonant capacitance, $C_r$, and thus the resonant frequency.

The voltage gain of LLC converters is modulated by the ratio of the switching frequency to the resonant frequency through a voltage feedback loop. In hSCC-LLC embodiments, this may be done by controlling the switching frequency of the half bridge, Q1 and Q2. Due to the component tolerance of the resonant tanks, paralleled LLC phases may not have the same resonant frequencies, resulting in imbalanced output current. This problem is solved by controlling $\alpha$ angle of $S_1$, which modulates the equivalent resonant capacitance through a load sharing feedback loop, and thus the resonant frequency of each LLC phase. Therefore, the output current of all the hSCC-LLC phases can be balanced.

Figure 8B:
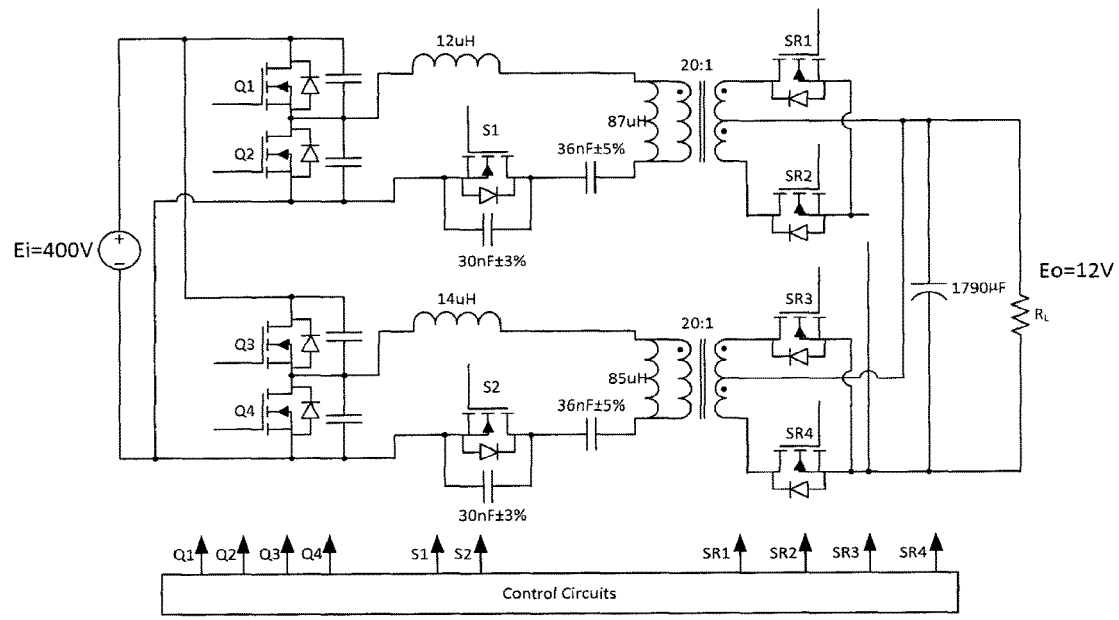
FIG. 8(b) is a schematic of a two-phase interleaved hSCC-LLC resonant converter according to one embodiment.

An embodiment of an interleaved variable switching frequency hSCC-LLC is shown in FIG. 8(b). In this embodiment the source node of the MOSFET of each hSCC is connected to ground, providing a simple driving circuit. Although two phases are shown, any number of LLC phases may be connected in parallel to expand the power capacity, and individual hSCC-LLC phases may be shut down when not needed in order to improve the light load efficiency.

Embodiments are further described by way of the following non-limiting Example.

2.4. Example 2

Figure 13:
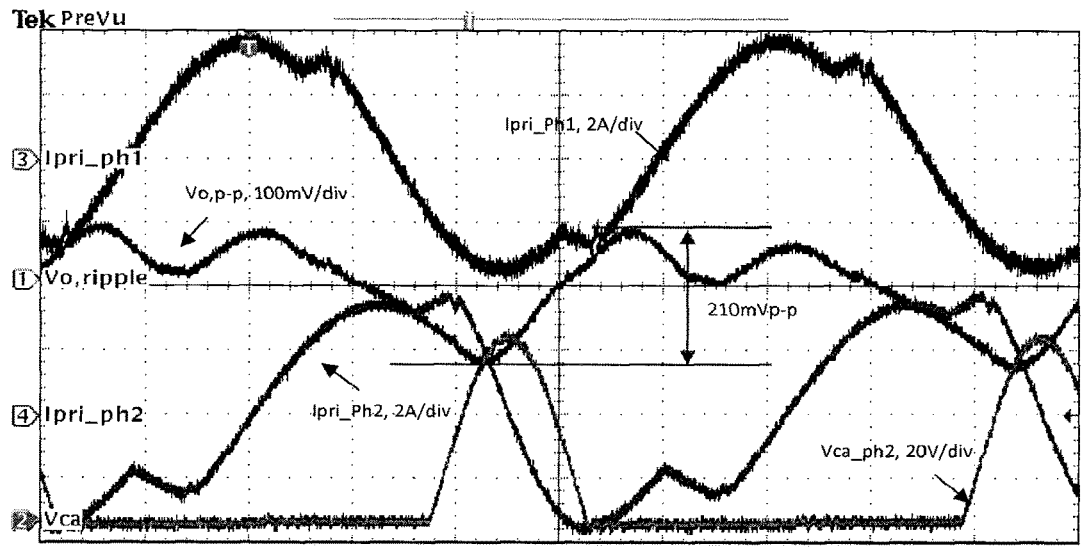
FIG. 13 shows the effectiveness of current ripple cancellation and load sharing for the two phase embodiment of FIG. 8(b) at full load current of 50 A, wherein the output voltage ripple is 210 mV.

A 600 W two-phase interleaved variable switching frequency hSCC-LLC was assembled. The schematic diagram is shown in FIG. 8(b), and the circuit parameters are the same as Example 1, except that hSCCs were used and the switching frequencies were variable and synchronized. FIG. 13 shows waveforms of the hSCC-LLC with variable switching frequency at 50 A load. The output voltage ripple is 210 mV peak to peak, compared to 500 mV in the comparable 600 W single-phase LLC in FIG. 11. The current of the two phases are well balanced. It is noted that the current of the two half-cycles in Phase 2 is slightly asymmetrical due to the unipolar modulation of the hSCC.

3. Control Schemes of fSCC-LLC and hSCC-LLC

3.1. Introduction

In the fSCC-LLC and hSCC-LLC converters as described herein, the switching frequency and the resonant frequency may be control variables to regulate the output voltage and balance the load current. These two control variables may be used independently or jointly to optimize performance and cost.

Both the SCC-LLC and the hSCC-LLC embodiments may operate at constant switching frequency; only the $\alpha$ angle (resonant frequency) is modulated for both output voltage regulation and load sharing. Also, both the fSCC-LLC and the hSCC-LLC embodiments may operate at synchronized but variable switching frequency; the switching frequency may be modulated for output voltage regulation, and the $\alpha$ angle (resonant frequency) may be modulated for load sharing.

Both the fSCC-LLC and the hSCC-LLC embodiments may be single phase or multiphase. For single-phase constant switching frequency embodiments, the fSCC and hSCC may be used to obtain favorable constant switching frequency operation. For single-phase variable switching frequency embodiments, the fSCC and hSCC may be used to reduce the switching frequency variation range.

In embodiments where both control variables are used, one of the fSCC-LLC or hSCC-LLC phases may be assigned as the master phase, and other phases modulate the output current accordingly. Therefore, the SCC in the master phase can be omitted.

Figure 8C:
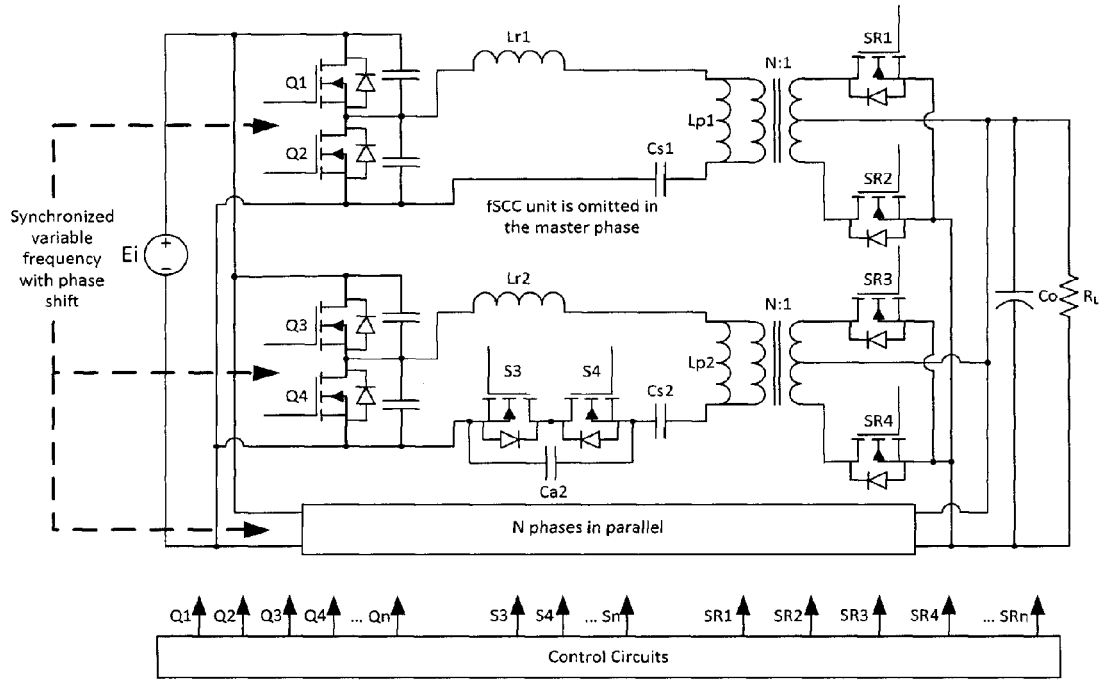
FIG. 8(c) is a schematic of a variable switching frequency SCC-LLC with simplified master phase according to one embodiment.

3.2. Structure of Variable Switching Frequency fSCC-LLC with Simplified Master Phase An embodiment of a variable switching frequency fSCC-LLC with simplified master phase is shown in FIG. 8(c). It is noted that the resonant tank parameters in the master phase should be smaller than in the other phases with tolerances taking into account. This is because the fSCC reduces the equivalent capacitance from the series capacitor value, but cannot increase the equivalent capacitance.

Figure 8D:
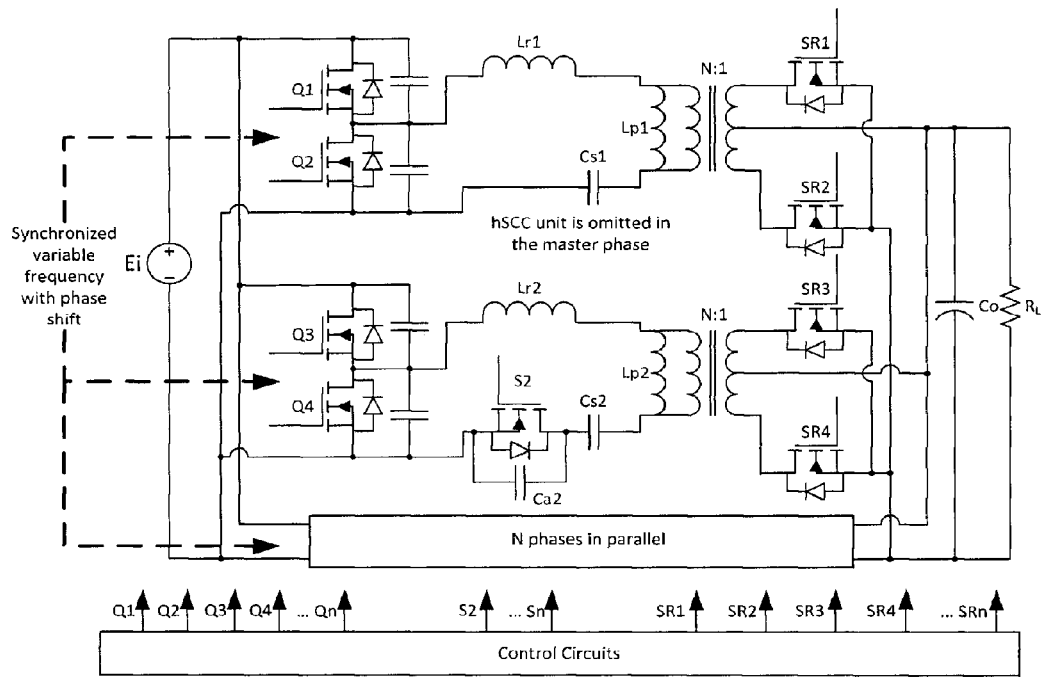
FIG. 8(d) is a schematic of a variable switching frequency hSCC-LLC with simplified master phase according to one embodiment.

3.3. Structure of Variable Switching Frequency hSCC-LLC with Simplified Master Phase An embodiment of a variable switching frequency hSCC-LLC with simplified master phase is shown in FIG. 8(d). It is noted that the resonant tank parameters in the master phase should be smaller than in the other phases with tolerances taking into account. This is because the hSCC reduces the equivalent capacitance from the series capacitor value, but cannot increase the equivalent capacitance.

4. Further Embodiments

Figure 15A:
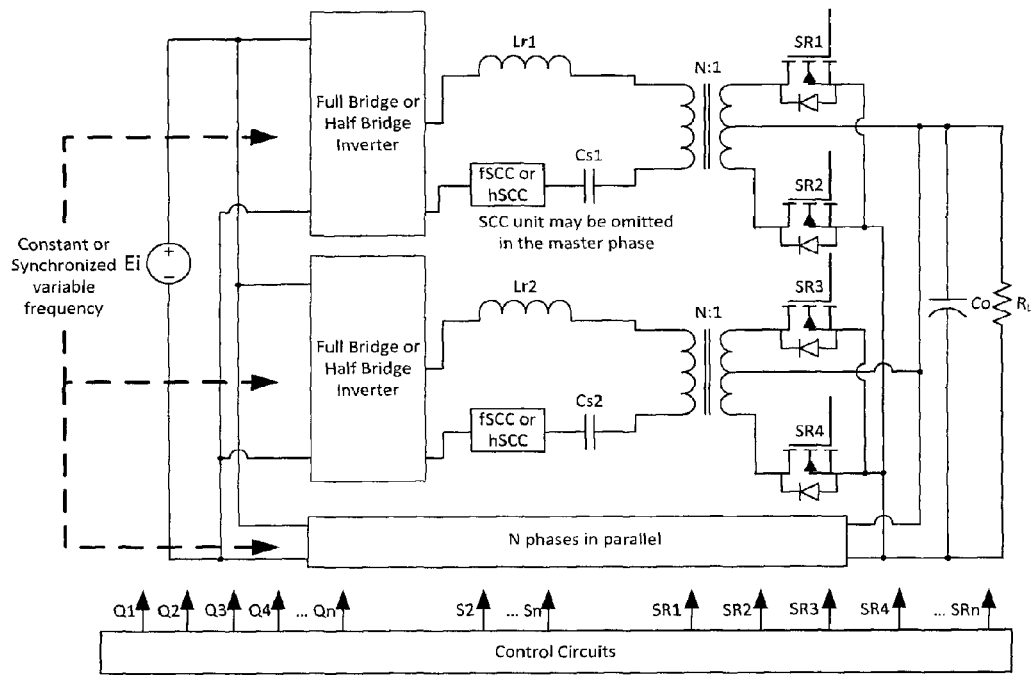
FIG. 15(a) is an N-phase interleaved SCC-series resonant converter with a series capacitor in the resonant tank, according to one embodiment.
Figure 15B:
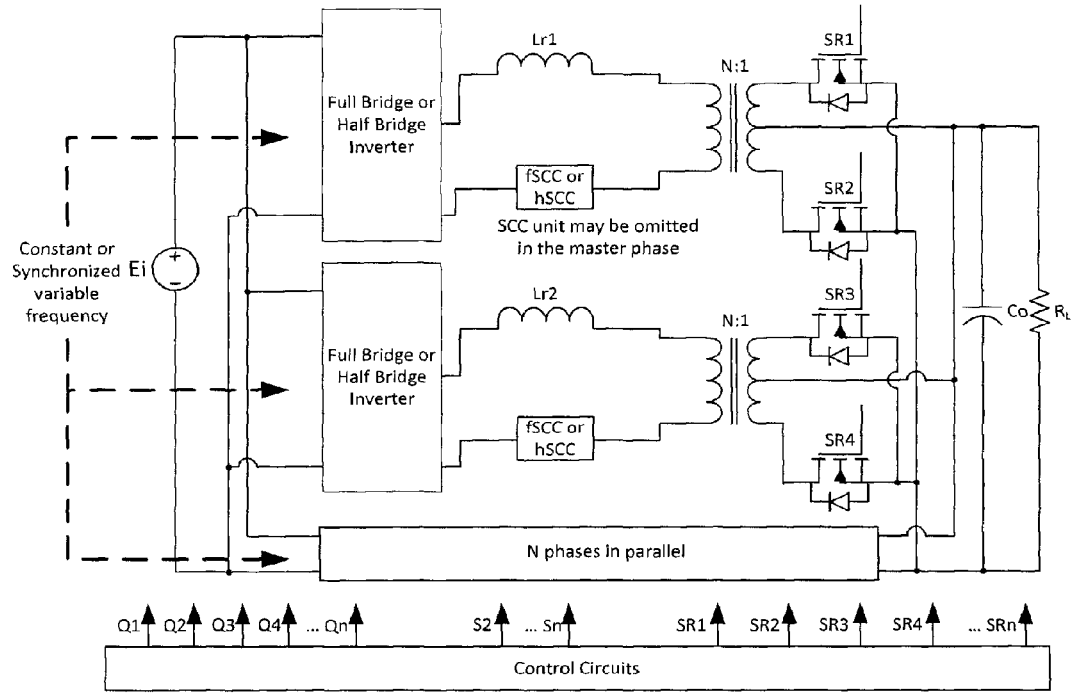
FIG. 15(b) is an N-phase interleaved SCC-series resonant converter with no series capacitor in the resonant tank, according to one embodiment.
Figure 15C:
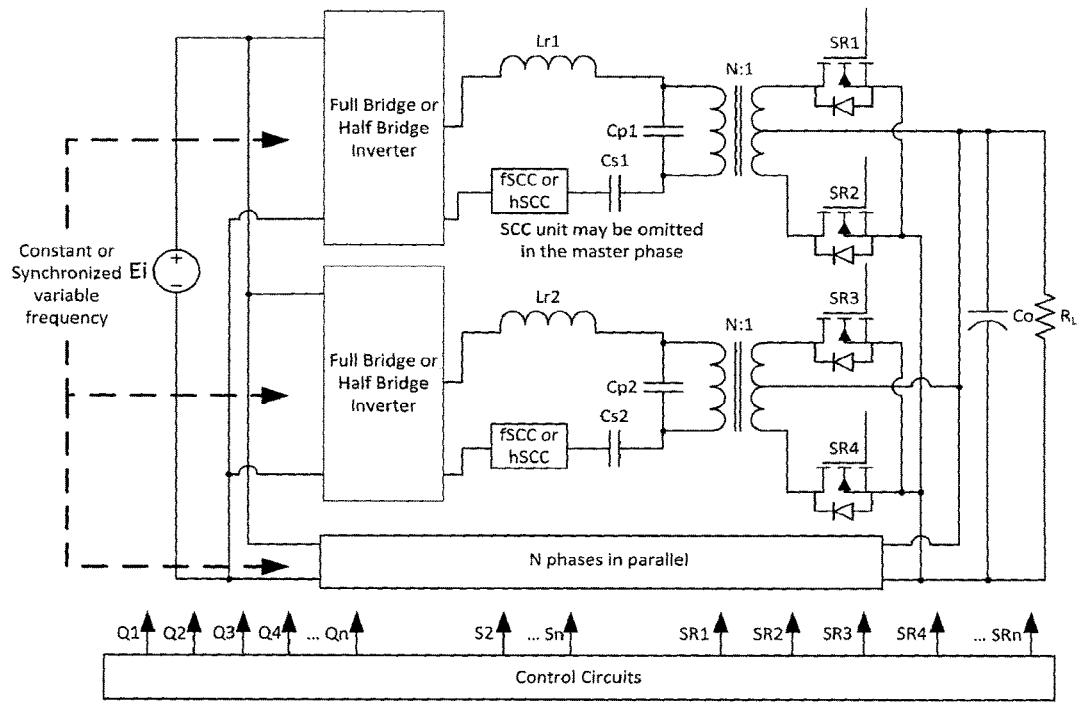
FIG. 15(c) is an N-phase interleaved SCC-LCC resonant converter with a series capacitor in the resonant tank, according to one embodiment.
Figure 15D:
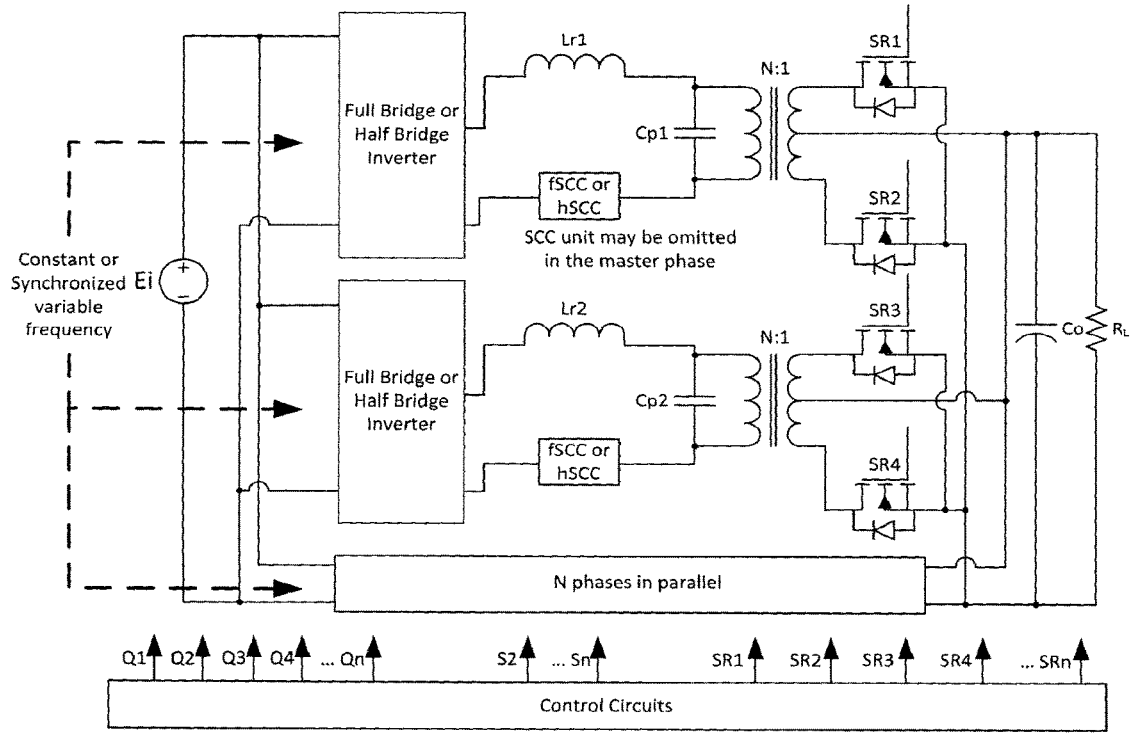
FIG. 15(d) is an N-phase interleaved SCC-LCC resonant converter with no series capacitor in the resonant tank, according to one embodiment.
Figure 15E:
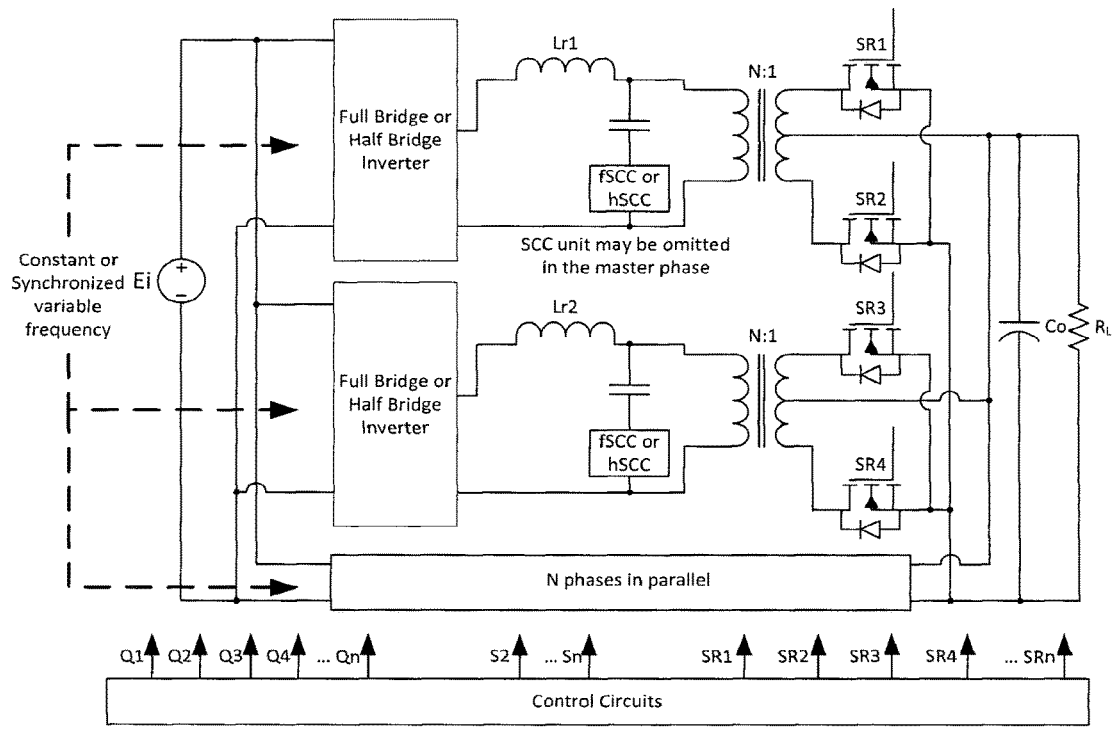
FIG. 15(e) is an N-phase interleaved SCC-parallel resonant converter with a series capacitor in the parallel branch, according to one embodiment.
Figure 15F:
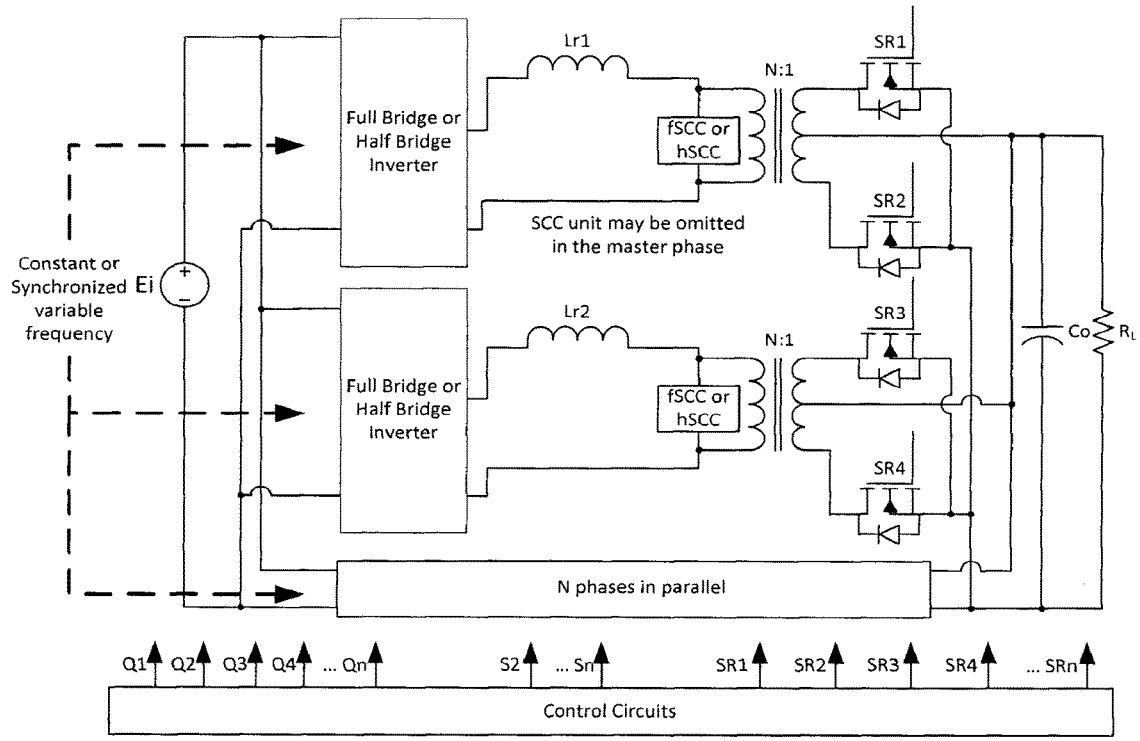
FIG. 15(f) is an N-phase interleaved SCC-parallel resonant converter with no series capacitor in the parallel branch, according to one embodiment.

Alternative embodiments are shown, but not limited to, the examples in FIGS. 15(a)-(f), wherein the converter may be full-bridge or half-bridge, the switching frequency may be constant or synchronized variable, the SCC may be full-wave or half-wave, and may include a master phase wherein the SCC may be omitted. FIG. 15(a) shows an N-phase interleaved SCC-series resonant converter with a series capacitor in the resonant tank; FIG. 15(b) shows an N-phase interleaved SCC-series resonant converter with no series capacitor in the resonant tank; FIG. 15(c) shows an N-phase interleaved SCC-LCC resonant converter with a series capacitor in the resonant tank; FIG. 15(d) shows an N-phase interleaved SCC-LCC resonant converter with no series capacitor in the resonant tank; FIG. 15(e) shows an N-phase interleaved SCC-parallel resonant converter with a series capacitor in the parallel branch; and FIG. 15(f) shows an N-phase interleaved SCC-parallel resonant converter with no series capacitor in the parallel branch.

The contents of all references, pending patent applications, and published patents cited throughout this disclosure are hereby expressly incorporated by reference.

EQUIVALENTS

Those of ordinary skill in the art will recognize or be able to ascertain variations, combinations, and equivalents of the embodiments, methods, and examples described herein. Such variants are within the scope of the invention and are covered by the appended claims.

REFERENCES

[1] H. Figge, T. Grote, N. Froehleke, J. Boecker and P. Ide, "Paralleling of LLC resonant converters using frequency controlled current balancing," in Proc. Power Electron. Specialists Conf. (PESC), Island of Rhodes, Greece, 2008, pp. 1080-1085.

[2] B.-C. Kim, K.-B. Park, C.-E. Kim, G.-W. Moon, "Load sharing characteristic of two-phase interleaved LLC resonant converter with parallel and series input structure," in Proc. Energy Conversion Congr. and Expo. (ECCE), San Jose, Calif., 2009, pp. 750-753.

[3] E. Orietti, P. Mattavelli, G. Spiazzi, C. Adragna and G. Gattavari, "Current sharing in three-phase LLC interleaved resonant converter," in Proc. Energy Conversion Congr. and Expo. (ECCE), San Jose, Calif., 2009, pp. 1145-1152.

[4] W.-J. Gu and K. Harada, "A new method to regulate resonant converters," IEEE Trans. Power Electron., vol. 3, no. 4 pp. 430-439, October 1988.

[5] "L6599 High-voltage resonant controller," Datasheet, STMicroelectronics, 2006.

The invention claimed is:

1. A resonant converter, comprising:
an input for receiving an input DC voltage;
at least one switch-controlled capacitor having only a first connection point and a second connection point, wherein at least one capacitor is connected in parallel with at least one switch between the first and second connection points;
a resonant tank circuit including the at least one switch-controlled capacitor, at least one inductor and at least one capacitor; and
an output for outputting an output DC voltage;
wherein the at least one switch-controlled capacitor controls a resonant frequency of the resonant tank circuit.

2. The resonant converter of claim 1, wherein the resonant converter is a LLC resonant converter.

3. The resonant converter of claim 1, wherein a switching frequency of the resonant converter is constant.

4. The resonant converter of claim 3, wherein the at least one switch-controlled capacitor is controlled by a feedback loop of a controller of the resonant converter.

5. The resonant converter of claim 1, wherein a switching frequency of the resonant converter is variable.

6. The resonant converter of claim 5, wherein the switching frequency is controlled by a feedback loop of a controller of the resonant converter; and
wherein the at least one switch-controlled capacitor is controlled by a controller of the resonant converter.

7. The resonant converter of claim 1, wherein the at least one switch-controlled capacitor is a full-wave switch-controlled capacitor.

8. The resonant converter of claim 1, wherein the at least one switch-controlled capacitor is a half-wave switch-controlled capacitor.

9. A method of operating a resonant converter, comprising:
providing a switch-controlled capacitor comprising at least one capacitor connected in parallel with at least one switch between only first and second connection points;
controlling a resonant frequency of a resonant tank circuit of the resonant converter using the switch-controlled capacitor;
wherein the resonant tank circuit includes at least one said switch-controlled capacitor, at least one inductor, and at least one resonant capacitor; and
controlling a switching frequency of the resonant converter.

10. The method of claim 9, comprising operating a LLC resonant converter.

11. The method of claim 9, comprising operating the resonant converter at a substantially constant switching frequency.

12. The method of claim 11, comprising controlling the switch-controlled capacitor using a feedback loop of a controller of the resonant converter.

13. The method of claim 9, comprising operating the resonant converter at a variable switching frequency.

14. The method of claim 13, comprising controlling the switching frequency using a feedback loop of a controller of the resonant converter.

15. The method of claim 13, comprising controlling the switch-controlled capacitor using a controller of the resonant converter.

16. The method of claim 9, comprising using a full-wave switch-controlled capacitor.

17. The method of claim 9, comprising using a half-wave switch-controlled capacitor.

* * * * *